United States Patent [19]
Miyauchi

[11] Patent Number: 5,661,805
[45] Date of Patent: Aug. 26, 1997

[54] SIGNATURE VERIFICATION APPARATUS CAPABLE OF OBTAINING INFORMATION REQUIRED FOR A DOCUMENT RECIPIENT BY USING AN APPARATUS'S VERIFICATION KEY ALONE

[75] Inventor: Hiroshi Miyauchi, Tokyo, Japan

[73] Assignee: NEC Corporation, Tokyo, Japan

[21] Appl. No.: 510,165

[22] Filed: Aug. 2, 1995

[30]  Foreign Application Priority Data

Aug. 3, 1994 [JP] Japan ................................ 6-182454
Dec. 8, 1994 [JP] Japan ................................ 6-305133

[51] Int. Cl.$^6$ ............................................ H04K 1/00
[52] U.S. Cl. ........................... 380/23; 380/4; 380/25; 380/49
[58] Field of Search ............................. 380/23, 24, 25, 380/3, 4, 49

[56]  References Cited

U.S. PATENT DOCUMENTS 4,806,740  2/1989  Gold et al. ............................. 235/449

Primary Examiner—David C. Cain
Attorney, Agent, or Firm—Foley & Lardner

[57]  ABSTRACT

In apparatus for performing signature verification for an input document on which at least one digital signature is put by at least one signer assigned with a signer's user ID code, an inputting section inputs the signature document. A user ID identifying section identifies the signer's user ID code in the input document to produce an identified user ID code indicative of the signer's user ID code. A user verification key holding unit preliminarily holds user verification keys for respective user ID codes to produce an identified verification key which is one of the user verification keys that corresponds to the identified user ID code. A signature verifying unit verifies the digital signature in the input document by using the identified verification key to produce a signature verification result. A verification result indicator message creating unit creates the verification result indicator message indicative of the signature verification result. An apparatus's signature key holding section holds an apparatus's signature key assigned to said apparatus. A signing section signs at least the verification result indicator message by using the apparatus's signature key to produce a signed document. An outputting section outputs the signed document as an output document.

61 Claims, 19 Drawing Sheets

$D_p$ {
  Document type { meeting holding notice }
  How about getting together to talk about a budget at the room number 305 at 10:00 a.m. tomorrow.
}

$D_{ss}$ {
  << signed by miyauchi@sirius, Sat. Jul. 1 14:37:09 1995, >>
  << Kq7JSQeM32VsaE7CPbzzs9wHBK8yPqxLiatm67UQEKWeRlpTVnSJuw >>
}

$D_p$ {
  Document type { meeting holding notice }
  How about getting together to talk about a budget at the room number 305 at 10:00 a.m. tomorrow.
}

$D_{ss}$ {
  << signed by miyauchi@sirius, Sat. Jul. 1 14:37:09 1995, >>
  << Kq7JSQeM32VsaE7CPbzzs9wHBK8yPqxLiatm67UQEKWeRlpTVnSJuw >>
}

$M_{vr}$ {
  == Acknowledgment by miyauchi@sirius on Jul. 1, 1995 is just. ==
  == Authority for acknowledgment of meeting holding notice is satisfied ==
}

$D_{as}$ {
  << signed by sigserv@sirius, sat. Jul. 1 14:50:22 1995, >>
  << IVvLae3sPpkFYFb9oRLuH72f6vAWxWPSfCTtC709icehOwoBq3KnDw >>
}

↗ $D_{out}$

FIG. 3

SIGNATURE VERIFICATION APPARATUS CAPABLE OF OBTAINING INFORMATION REQUIRED FOR A DOCUMENT RECIPIENT BY USING AN APPARATUS'S VERIFICATION KEY ALONE

BACKGROUND OF THE INVENTION

This invention relates to signature verification apparatus for performing verification of one or more digital signatures signed on a document.

To facilitate signature verification in the document on which one or more digital signatures are signed, a "sealing" method is known. The sealing method is a method where an authority seals a verification key and user information. In the sealing method, a signer preliminarlly sends his or her verification key and the user information to the authority to get the authority to put an authority's signature on the document. This is called "seal" hereinafter. After the signer puts a signer's signature on the document, the signer attaches the seal to it before sending it as an input document to a document recepient. On receiving the input document, the document recepient at first verifies the authority's signature in the input document to confirm that the authority's signature is justice. If the authority's signature is justice, the document recepient can know that the authority certified the signer's verification key and the user information. As a result, the document recepient can verify the signer's signature by using the signer's verification key.

Such a method is described in detail by Warwick Ford in Chapter 4 of a book published by PTR Prentice Hall, (1994) and titled "Computer Communication Security," on pages 65 to 107. This book illustrates Privacy Enhanced Mail (PEM) as an instance of key management. In this system, a user holds certification information which puts a certification signature of a certification office on its own user verification key and personal information and the user sends a signature document attached with the certification information.

Another method is disclosed in detail U.S. Pat. No. 5,005,200 issued to Fischer. Fisher's U.S. patent enforces limitations and accountability from hierarchy to hierarchy so that the recipient of any message signed with such a (hierarchically derived) certificate can be assured that the authority represented by the signer is strictly accounted. The Fisher's U.S. patent provides a methodology for digitally signing documents in which the signature is generated for both computer verification and for reverification if a document needs to be reconfirmed in the future by reentering it from a paper rendition. To accomplish this end, two hash values are utilized in digital signatures of document-type computer messages. The first hash value which is utilized relates to the exact bit-for-bit data in the file. This will allow for validation of the exact original document as long as it is accessible in computer readable form.

In Fisher's U.S. patent, each terminal is capable of generating a plain text or unenciphered message and performing whatever signature operation may be required, and transmitting the message to any of the other terminals connected to communications channel (or to a communications network which may be connected to a communications channel). Additionally, each terminal is capable of performing signature verification on each message. As is well known in the art with respect to public key cryptosystems, each of the terminal users has a public encrypting key and an associated private secret decrypting key. In the public key cryptosystem, each terminal user is aware of the general method by which the other terminal users encrypt a message. Additionally, each terminal user is aware of the encryption key utilized by the terminal's encryption procedure to generate the enciphered message. Each terminal user, however, by revealing his encryption procedure and encryption key does not reveal his private decryption key which is necessary to decrypt the ciphered message and to create signatures. In this regard, it is computationally unfeasible to compute the decryption key from knowledge of the encryption key.

In the above-mentioned conventional methods, the certification signature of the certification office is invalid when a part of the verification key and the personal information is cut down. As a result, it is necessary to attach all information including unnecessary user information to an objective document. It results in increasing the amount of the information attached to the signature document. In addition, in the above-mentioned conventional methods, each user must manage its own information to get the authority such as the certification office to sign. As a result, this places a heavy burden on the user.

There is in an actual document a case where a procedure so that a drafter signs and thereafter his or her superiors sign is required. Under the circumstances, in the conventional methods, in order to use information indicative of relationships between superiors and subordinates, each user must describe all of such relationships in its own user information. Accordingly, it is difficult to attain consistent information. In addition, each user must update the user information on a change of organization.

Furthermore, in digital signature, a lot of algorithms have been already published. In this event, all offices are not necessarily to use the same algorithms. It is assumed that an office A performs a digital signature and verification by using an algorithm A while another office B performs a digital signature and verification by using another algorithm B. In such a case, it is impossible to verify, in the office B, a document signed in the office A. Although it is possible to unify a signature scheme in the same company, it is impossible in general to unify a signature scheme between companies. As a result, a sending range where the signature is valid is restricted. In addition, a similar problem occurs due to difference in a signature format in spite of the same signature scheme.

SUMMARY OF THE INVENTION

It is therefore an object of this invention to provide signature verification apparatus which is capable of verifying an input document in place of a document recipient.

It is another object of this invention to provide signature verification apparatus of the type described, which holds a lot of information such as verification keys and user information.

It is still another object of this invention to provide signature verification apparatus of the type described, which is capable of signing verification result by using an apparatus's signature key.

It is yet another object of this invention to provide signature verification apparatus of the type described, which is capable of allowing the document recipient to confirm signer's signatures and validity thereof by verifying an apparatus's signature by the signature verification apparatus alone.

It is a further object of this invention to provide signature verification apparatus of the type described, which is capable of confirming validity of signer's signatures although different signature schemes are used between offices or between companies.

It is a still further object of this invention to provide signature verification apparatus of the type described, which is capable of confirming validity of signer's signatures although different signature formats are used between offices or between companies.

Other objects of this invention will become clear as the description proceeds.

On describing the gist of an aspect of this invention, be understood that the is for performing signature verification for an input document on which at least one digital signature is put by at least one signer.

According to an aspect of this invention, the above-understood apparatus comprises an inputting section for inputting the input document. Connected to the inputting section, an identifying section identifies document peculiar information included in the input document to produce an identified document peculiar information signal indicative of the document peculiar information. Connected to the identifying section, a document related information holding section preliminarily holds a plurality of document related information signals. The document related information holding section produces, as a specified document related information signal, one of the document related information signals that corresponds to the identified document peculiar information signal. Connected to the inputting unit and the document related information holding section, a verifying section verifies the digital signature signed in the input document by using the specified document related information signal. The verifying section produces a verification result indicator message indicative of a verification result. An apparatus's signature key holding section holds an apparatus's signature key assigned to said apparatus. Connected to the inputting section, the verifying. section, and the apparatus's signature key holding section, a signing section signs at least the verification result indicator message by using the apparatus's signature key to produce a signed document. Connected to the signing section, an outputting section outputs the signed document as an output document.

On describing the gist of another aspect of this invention, it can be understood that a method is for performing signature verification for an input document on which at least one digital signature is put by at least one signer.

According to another aspect of this invention, the afore-understood method comprises the steps of: (a) inputting the input document; (b) identifying document peculiar information included in the input document to produce an identified document peculiar information signal; (c) accessing a document related information holding section for preliminarily holding a plurality of document related information signals to make the document related information holding section produce, as a specified document related information signal, one of the document related information signals which corresponds to the identified document peculiar information signal; (d) verifying the digital signature in the input document by using the specified document related information signal to produce a verification result indicator message indicative of a verification result; (e) signing at least the verification result indicator message by using an apparatus's signature key held in an apparatus's signature key holding section to produce a signed document; and (f) outputting the signed document as an output document.

BRIEF DESCRIPTION OF THE DRAWING

FIG. 2 shows an example of an input document inputted to the signature verification apparatus illustrated in FIG. 1;

FIG. 3 shows an example of an output document outputted from the signature verification apparatus illustrated in FIG. 1;

DESCRIPTION OF THE PREFERRED EMBODIMENTS

Principles of the Invention

Figure 1:
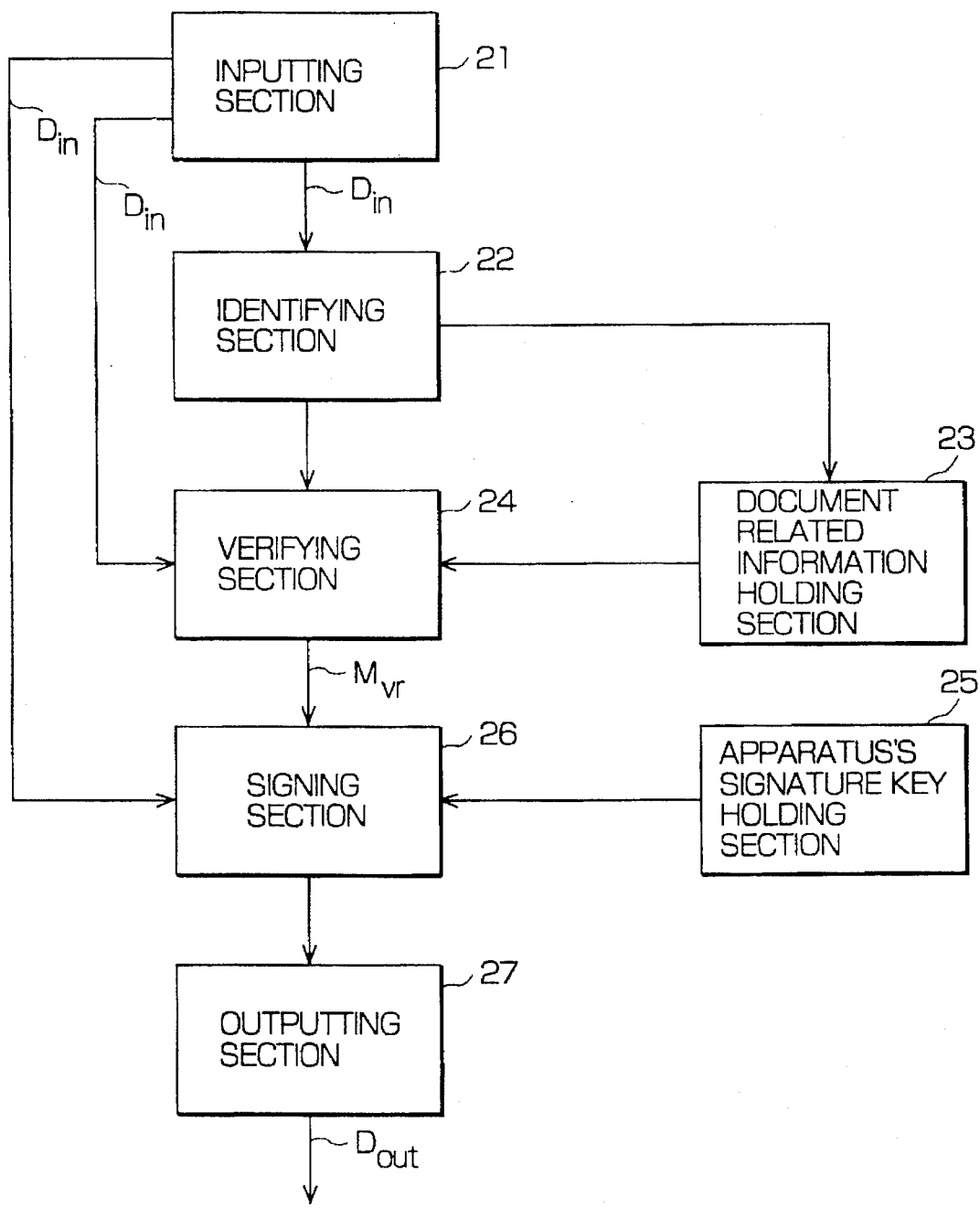
FIG. 1 is a block diagram of signature verification apparatus according to a first embodiment of this invention.

The description will at first be directed to the principles of this invention. This invention uses a technique of digital signature as a signature realizing method. In the manner which later will become clear, the technique of the digital signature and a hash function are described in the above-mentioned book having a title of "Computer Communications Security" and by Ikeno et al in Chapter 12 of a book published by the Institute of Electronics, Information and Communication Engineers and titled "Modern Cryptograph Theory", on pages 217 to 239 in detail. Herein, a public-key cryptosystem is briefly described using symbols in this specification.

Signature and verification in the digital signature are calculated by using a signature function "sign", a verification function "verify", a signature key $D_i$ for a user i, and a verification key $E_i$ for the user i as follows:

$$\text{signature document} = \text{sign}(\text{objective document}, D_i); \quad (1)$$

and $$\text{verification result} = \text{verify}(\text{objective document, signature document}, E_i). \quad (2)$$

In general, the verification result is TRUE (justice) if the signature key $D_i$ and the verification key $E_i$ are justly used as regards the objective document depicted at m. Otherwise, the verification result is FALSE (injustice). That is, the following relationship is satisfied:

$$\forall m: \text{verify}(m, \text{sign}(m, D_i), E_i) = \text{TRUE}. \quad (3)$$

In addition, the following relationships are satisfied at a high probability of, for example, $(1-2^{-64})$:

$$\text{if } m' \neq m \text{ then verify}(m', \text{sign}(m, D_i), E_i) = \text{FALSE}; \quad (4)$$

$$\text{and if } D' \neq D_i \text{ then verify}(m, \text{sign}(m, D'), E_i) = \text{FALSE}. \quad (5)$$

These mean that injustice occurs in a case where any user except for the user i signs by setting itself up as the user i or in a case where the signature document for the document m is diverted to the document m'.

The signature key $D_i$ is secretly kept by a signer and the verification key $E_i$ is opened to the general public. The verification key $E_i$ and the signature key $D_i$ are created so that it is difficult to calculate one on the basis of another. A constructing method for these keys and procedure for actual signature verification are described in the above-mentioned book having a title of "Computer Communications Security" and the above-mentioned U.S. Pat. No. 5,005,200 in detail.

This invention relates to the signature verification apparatus for verifying at least one digital signature put on a document and for signing with information required by a document recipient attached. When an input document with the digital signature is directly sent to the document recepient, the document recipient must acquire or obtain each verification key for each signature, information for each signer, and a relationship between signers in some manner. The signature verification apparatus according to this invention inputs the above-mentioned input document, attaches it with the result of signature verification and user information required by the document recipient, and puts the signature of the apparatus on it to produce it as an output document. The output document is a document where information required by the document recipient is obtained by an apparatus's verification key assigned to the apparatus.

In the manner as described above, the signature verification apparatus according to the present invention converts or translates the input document requiring various information for verification into the output document which is enable to verify by using only the apparatus's verification key assigned to the apparatus.

In addition, in a case where a document originating section and a document receiving section use different signature schemes than each other, it is possible for this invention to verify a signature of the document originating section and to sign with this result using the signature scheme for the document receiving section. According to this method, the document receiving section can indirectly verify the signature of the document originating section.

[Embodiments]

Referring to FIG. 1, description will begin with signature verification apparatus according to a first embodiment of this invention. The signature verification apparatus performs signature verification for an input document Din on which at least one digital signature is put by at least one signer. The signer is assigned with a signer's user ID code and has a signer's signature key.

Turning to FIG. 2, the input document $D_{in}$ comprises a plain or an objective document $D_p$ and a signer's signature document $D_{ss}$. The plain document $D_p$ includes a document type of "meeting holding notice". The signer's signature document $D_{ss}$ includes the signer's user ID code of "miyauchi@sirius", a signing date of "Jul. 1, 1995", and a signer's digital signature which is obtained by signing the plain document $D_p$ by using the signer's signature key in accordance with the above Equation (1).

Turning back to FIG. 1, the signature verification apparatus comprises an input section 21, an identifying section 22, a document related information holding section 23, a verifying section 24, an apparatus's signature key holding section 25, a signing section 26, and an outputting section 27.

The inputting section 21 inputs the input document $D_{in}$. The inputting section 21 is connected to the identifying section 22, the verifying section 24, and the signing section 26. The inputting section 21 supplies the input document $D_{in}$ to the identifying section 22, the verifying section 24, and the signing section 26.

The identifying section 22 identifies or extracts document peculiar information included in the input document $D_{in}$ to produce an identified document peculiar information signal indicative of the document peculiar information. The identifying section 22 is connected to the document related information holding section 23 and the verifying section 24. If only one digital signature is put on the input document $D_{in}$ by only one signer as shown in FIG. 2, the identifying section 22 may be connected to the document related information holding section 23 alone. The identifying section 22 supplies the identified document peculiar information signal to the document related information section 22 and the verifying section 24.

The document related information holding section 23 preliminarily holds a plurality of document related information signals. Responsive to the identified document peculiar information signal, the document related information holding section 23 produces, as a specified document related information signal, one of the document related information signals that corresponds to the identified document peculiar information signal. The document related information holding section 23 is connected to the verifying section 24. The document related information holding section 23 supplies the specified document related information signal to the verifying section 24.

The verifying section 24 verifies the digital signature put on the input document $D_{in}$ by using the specified document related information signal in accordance with the above Equation (2) to produce a verification result indicator message $M_{vr}$ indicative of a verification result. The verifying section 24 is connected to the signing section 26. The verifying section 24 supplies the verification result indicator message $M_{vr}$ to the signing section 26.

When the verification result is true, the verification result indicator message $M_{vr}$ is, for example, "Acknowledgment by miyauchi@sirius, Jul. 1, 1995 is just" and "Authority for acknowledgment of meeting holding notice is satisfied". If the verification result is false, the verification result indicator message $M_{vr}$ is, for example, "Acknowledgment by miyauchi@sirius, Jul. 1, 1995 is unjust" and "Authority for acknowledgment of meeting holding notice is not satisfied".

The apparatus's signature key holding section 25 holds an apparatus's signature key assigned to the signature verification apparatus. The apparatus's signature key holding section 25 is connected to the signing section 26. The apparatus's signature key holding section 25 supplies the apparatus's signature key to the signing section 26.

The signing section 26 signs both of the plain document $D_p$ and the verification result indicator message $M_{vr}$ by using the apparatus's signature key to produce a signed document. The signing section 26 is connected to the outputting section 27. The signing section 26 supplies the signed document to the outputting section 27. The signing section 26 may sign only the verification result indicator message $M_{vr}$ by using the apparatus's signature key. The outputting section 27 outputs the signed document as an output document $D_{out}$.

Turning to FIG. 3, the output document $D_{out}$ comprises the plain document $D_p$, the signer's signature document $D_{ss}$, the verification result indicator message $M_{vr}$, and an apparatus's signature document $D_{as}$. The apparatus's signature document $D_{as}$ includes the apparatus's ID code of "sigserv@sirius", a signing date of "Jul. 1, 1995" and an apparatus's digital signature which is obtained by signing both of the plain document $D_p$ and the verification result indicator message $M_{vr}$ by using the apparatus's signature key.

Figure 4:
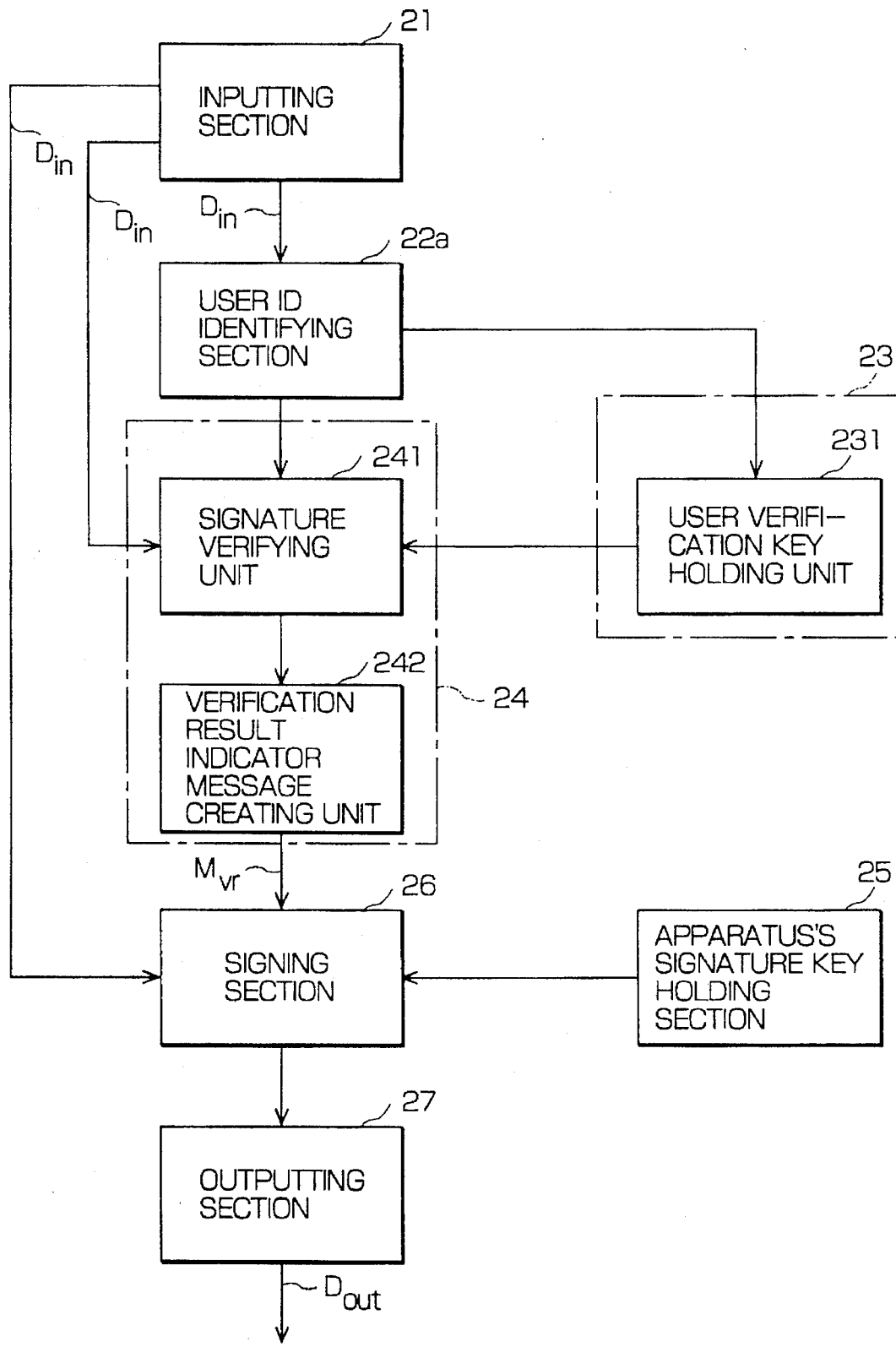
FIG. 4 is a block diagram of signature verification apparatus according to a second embodiment of this invention.

Referring to FIG. 4, the description will proceed to signature verification apparatus according to a second embodiment of this invention. The illustrated signature verification apparatus is similar in structure to that illustrated in FIG. 1 except that the identifying section 22 is modified into a user ID identifying section 22a, the document related information holding section 23 comprises a user verification key holding unit 231 alone, and the verifying section 24 comprises a signature verifying unit 241 and a verification result indicator message creating unit 242.

The user ID identifying section 22a identifies one or more signer's user ID codes in the input document $D_{in}$ as the document peculiar information. The user ID identifying section 22a produces one or more identified user ID codes indicative of the signer's user ID codes as the identified document peculiar information signal. The user ID identifying section 22a is connected to the user verification key holding unit 231 and the signature verifying unit 241. If the user ID identifying section 22a produces only one identified user ID code, the user ID identifying section 22a may be connected to the user verification key holding unit 231 alone. The user ID identifying section 22a supplies the one or more identified user ID codes to the user verification key holding unit 231 and the signature verifying unit 241.

In the example being illustrated, the user ID corresponds to a specific private person as exemplified in FIG. 2. The user ID code may correspond to a specific user group or a specific organization. The user ID code may correspond to a post such as a mayor, the president, a director and so on.

The user verification key holding unit 231 preliminarily holds user verification keys for respective user ID codes as the document related information signals. Responsive to the one or more identified user ID codes, the user verification key holding unit 231 produces, as the specified document related information signal, one or more identified verification keys which ones of the user verification keys that correspond to the one or more identified user ID codes. The user verification key holding unit 231 is connected to the signature verifying unit 241. The user verification key holding unit 231 supplies the one or more identified verification keys to the signature verifying unit 241.

The signature verifying unit 241 receives the input document Din, the one or more identified user ID codes, and the one or more identified verification keys from the inputting section 21, the user ID identifying section 22a, and the user verification key holding section 231, respectively. The signature verifying unit 241 verifies all of signer's digital signatures included in the input document $D_{in}$ by using the one or more identified verification keys. The signature verifying unit 241 produces a signature verification result as the verification result. The signature verifying unit 241 is connected to the verification result indicator message creating unit 242. The signature verifying unit 241 supplies the signature verification result to the verification result indicator message creating unit 242.

In the example being illustrated, the signature verification result includes information related to signature's order, one or more signer's ID codes, and signing time and information indicating whether the one or more digital signatures are true or false. The signature verification result may be information obtained by omitting some pieces from pieces of the above-mentioned information. The signature verification result may be a document written by natural language or may be described by internal representation of the apparatus. The internal representation is, for example, internal representation of UNIX which indicates, as a current time instant, lapse seconds from a specific time instant. The internal representation may be representation of format where a computer can easily process therein.

The verification result indicator message creating unit 242 receives the signature verification result from the signature verifying unit 241. The verification result indicator message creating unit 242 rewrites a format of the signature verification result into a format required by a document recipient to create the verification result indicator message indicative of the signature verification result. The verification result indicator message creating unit 242 is connected to the signing section 26. The verification result indicator message creating unit 242 supplies the verification result indicator message to the signing section 26.

The format required by the document recipient is predetermined. This format may be a description by natural language or may be an input format for the apparatus which the document recipient uses. If the signature verifying unit 241 produces the signature verification result having the format required by the document recipient, the verification result indicator message creating unit 242 may produce the signature verification result as the verification result indicator message. In other words, the verification result indicator message creating unit 242 may be omitted.

Figure 5:
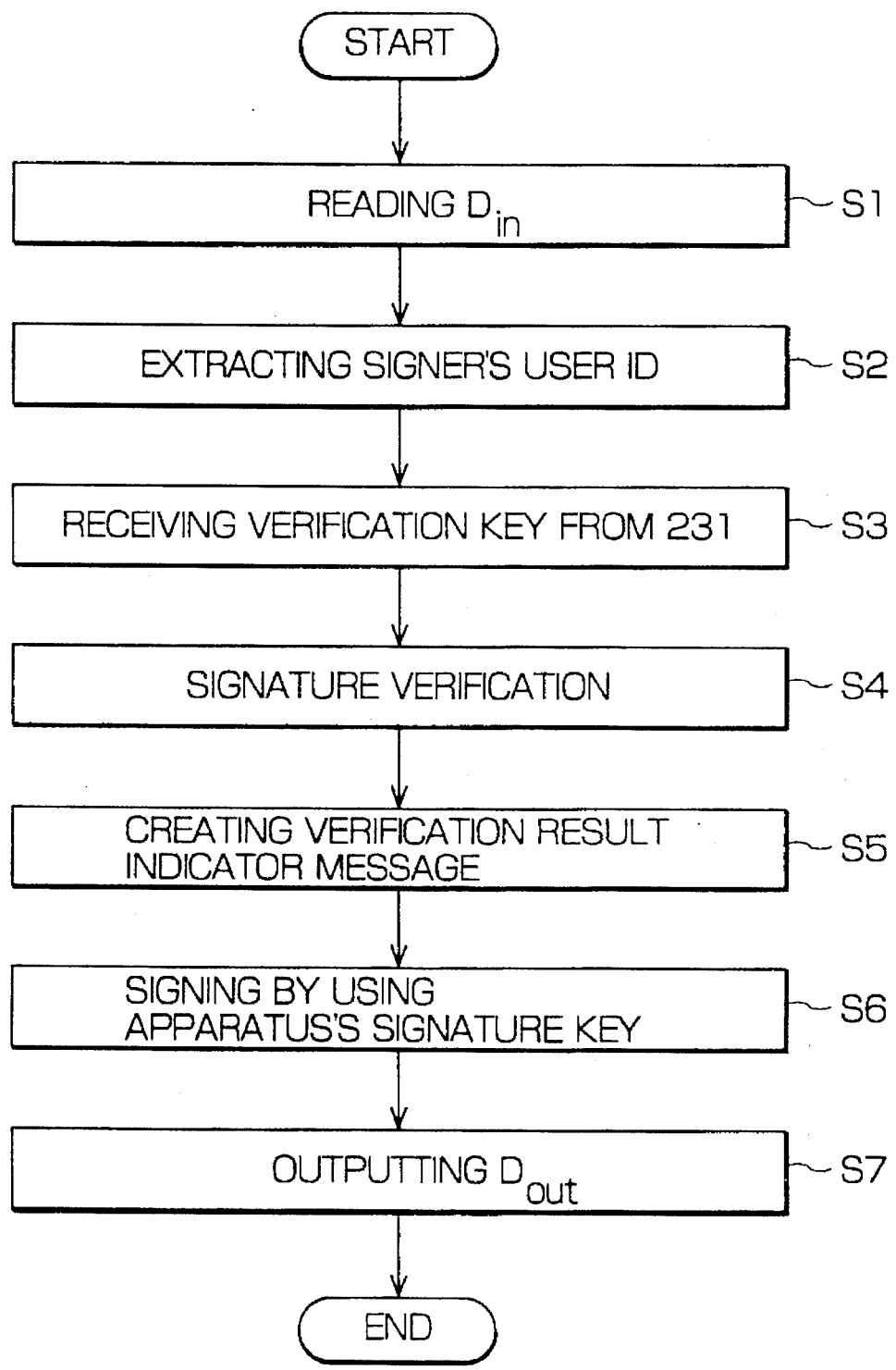
FIG. 5 shows a flow chart for use in describing operation of the signature verification apparatus illustrated in FIG. 4.

Referring to FIG. 5 in addition to FIG. 4, description will be made as regards operation of the signature verification apparatus illustrated in FIG. 4.

At first, the inputting section 21 reads or inputs the input document $D_{in}$ as shown at a first step S1. The inputting section 21 sends the input document $D_{in}$ to the user ID identifying section 22a, the signature verifying unit 241, and the signing section 26. The first step S1 is followed by a second step at which the user ID identifying section 22a extracts or identifies all of the signer's user ID codes included in the input document $D_{in}$. The user ID identifying section 22a sends the one or more identified user ID codes to the signature verifying unit 241 and the user verification key holding unit 231. The second step S2 proceeds to a third step S3 at which the user verification key holding unit 231 sends, in response to the one or more identified user ID codes, the one or more identified verification keys to the signature verifying unit 241. In other words, the signature verifying unit 241 receives the one or more identified verification keys from the user verification key holding unit 231.

The third step S3 is succeeded by a fourth step S4 at which the signature verifying unit 241 verifies all of the signer's digital signatures included in the input document $D_{in}$ by using the one or more identified verification keys. The signature verifying unit 241 sends the signature verification result to the verification result indicator message creating unit 242. The fourth step S4 is followed by a fifth step S5 at which the verification result indicator message creating unit 242 creates the verification result indicator message indicative of the signature verification result. The verification result indicator message creating unit 242 sends the verification result indicator message to the signing section 26. The fifth step S5 proceeds to a sixth step S6 at which the signing section 26 signs both the input document $D_{in}$ and the verification result indicator message $M_{vr}$ as an object by using the apparatus's signature key. The signing section 26 may sign only the verification result indicator message $M_{vr}$ as the object using the apparatus's signature key. The signing section 26 sends the signed document to the outputting section 27. The sixth step S6 is succeeded by a seventh step S7 at which the outputting section 27 outputs the signed document as the output document $D_{out}$.

Figure 6:
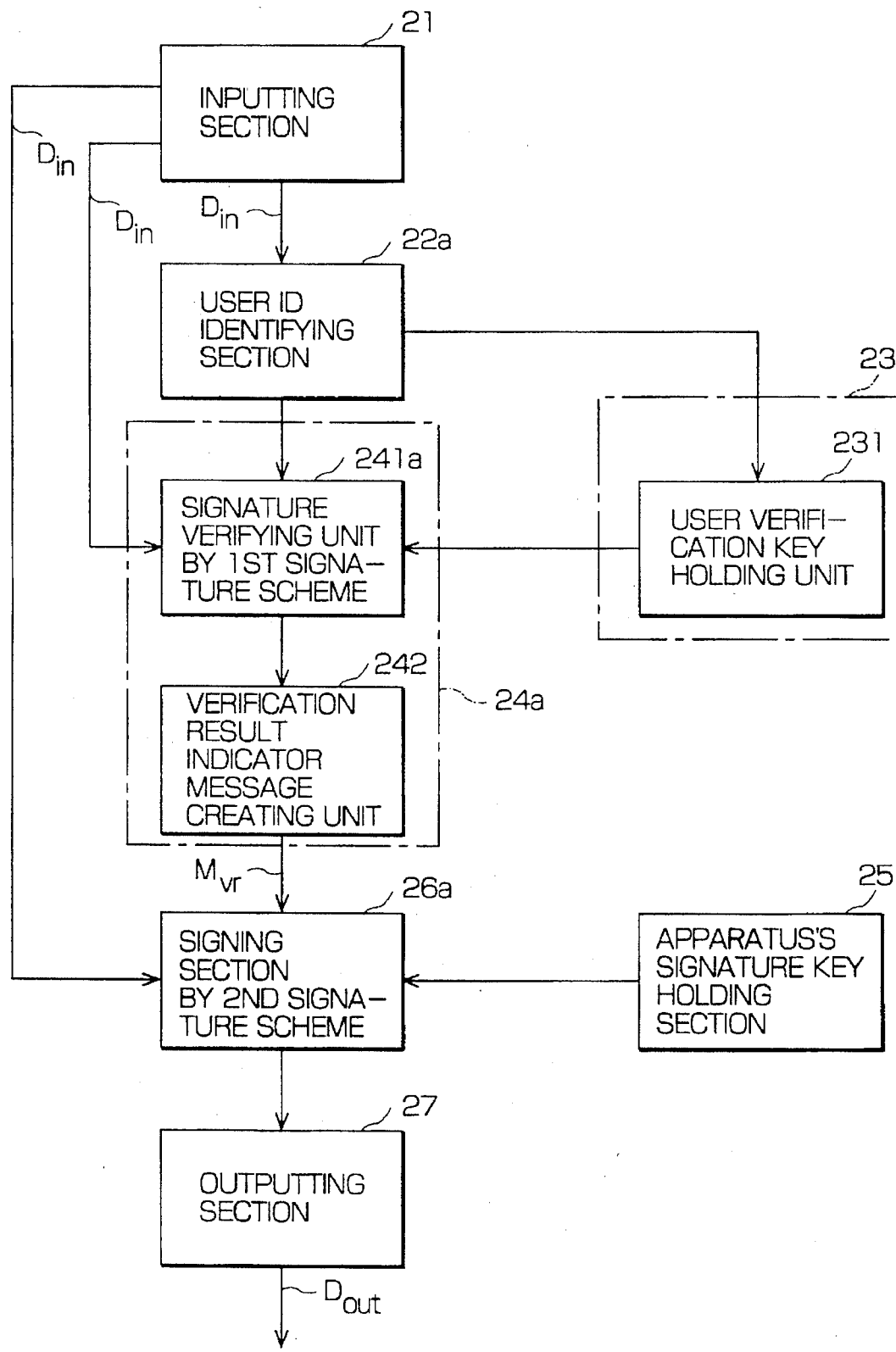
FIG. 6 is a block diagram of signature verification apparatus according to a third embodiment of this invention.

Referring to FIG. 6, the description will proceed to signature verification apparatus according to a third embodiment of this invention. The illustrated signature verification apparatus is similar in structure to that illustrated in FIG. 4 except that the verifying unit and the signing section are modified to be different from those described in conjunction with FIG. 4 as will later become clear. The verifying unit and the signing section are therefore depicted at 24a and 26a, respectively.

The verifying unit 24a is similar in structure to the verifying unit 24 shown in FIG. 4 except that the verifying unit 24a comprises a signature verifying unit 241a by a first signature scheme instead of the signature verifying unit 241 in FIG. 4. The signing section 26a is a signing section by a second signature scheme different from the first signature scheme.

Herein, the first and the second signature schemes are signature algorithms such as an RSA digital signature scheme and a DSA digital signature scheme. The RSA is a reversible public-key cryptographic system, named after its inventors, Rivest, Shamir, and Adleman, from MIT. The RSA cryptographic system is disclosed in U.S. Pat. No. 4,405,829 issued to Rivest et al. The DSA is an abbreviation of Digital Signature Algorithm which is disclosed in the above-mentioned book having the title of "Computer Communications Security". When the first and the second signature schemes are different from each other, not only the signature function "sign" and the verification function "verify" in the first signature scheme are different from those in the second signature scheme but also utilization of the signature key and of the verification key in the first signature scheme are different from those in the second signature scheme. In the example being illustrated, the first signature scheme is the RSA digital signature scheme while the second signature scheme is the DSA digital signature scheme.

The signature verifying unit 241a receives the input document $D_{in}$, the one or more identified user ID codes, and the one or more identified verification keys from the inputting section 21, the user ID identifying section 22a, and the user verification key holding unit 23, respectively. The signature verifying unit 241a verifies justice of all of the signer's digital signatures included in the input document $D_{in}$ by using the verification function of the first signature scheme (the RSA digital signature scheme). The signature verifying unit 241a sends the signature verification result to the verification result indicator message creating unit 242.

The signing section 26a receives the input document $D_{in}$, the verification result indicator message $M_{vr}$, and the apparatus's signature key from the inputting section 21, the verification result indicator message unit 242, and the apparatus's signature key holding section 25, respectively. The signing section 26a signs both the input document $D_{in}$ and the verification result indicator message $M_{vr}$ as an object by using the apparatus's signature key in accordance with the signature function of the second second signature scheme (the DSA digital signature scheme) to create the signed document. The signing section 26a may use, as the object, the verification result indicator message $M_{vr}$ alone in place of both of the input document $D_{in}$ and the verification result indicator message $M_{vr}$.

Figure 7:
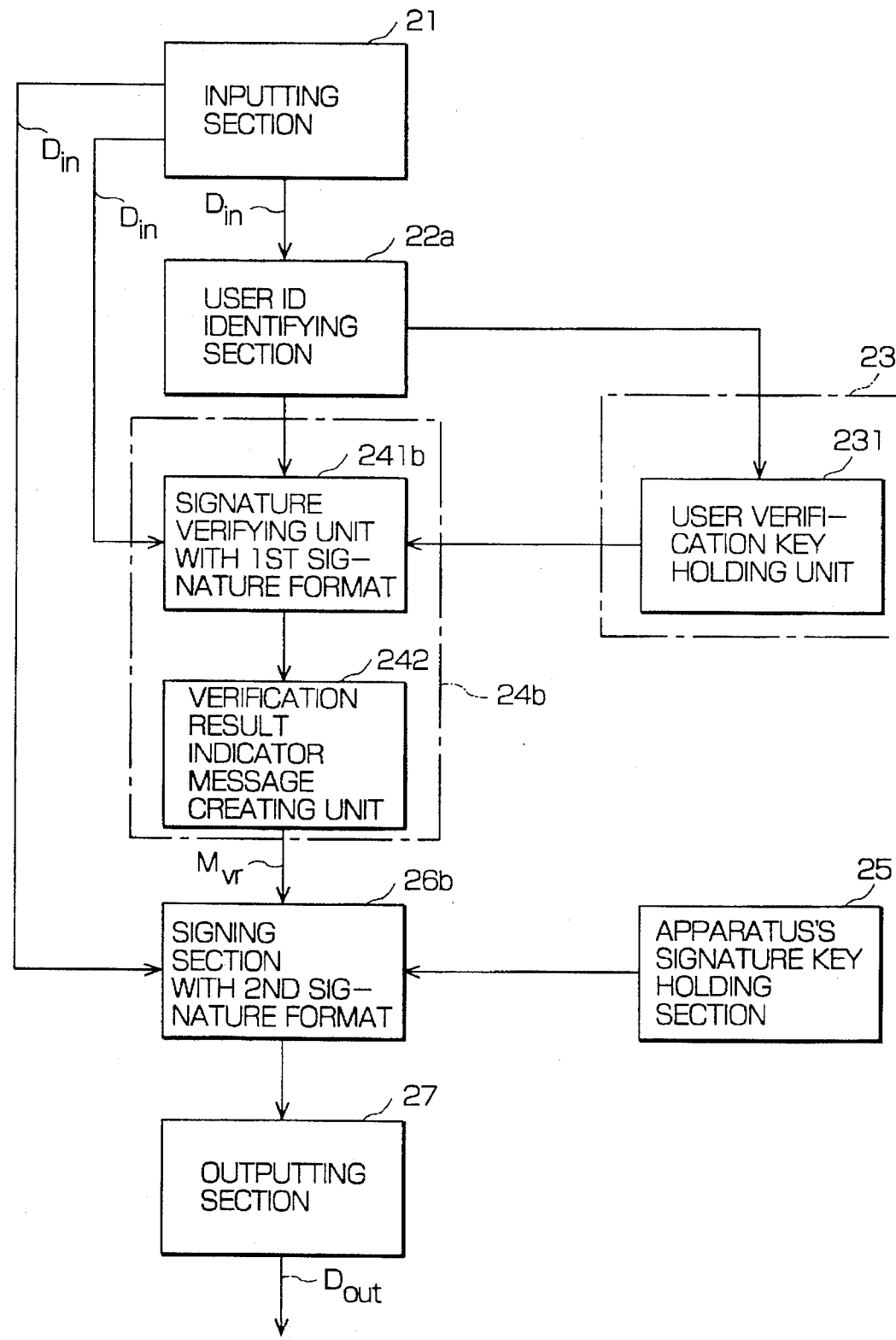
FIG. 7 is a block diagram of signature verification apparatus according to a fourth embodiment of this invention.

Referring to FIG. 7, the description will proceed to signature verification apparatus according to a fourth embodiment of this invention. The illustrated signature verification apparatus is similar in structure to that illustrated in FIG. 4 except that the verifying unit and the signing section are modified to be different from those described in conjunction with FIG. 4 as will later become clear. The verifying unit and the signing section are therefore depicted at 24b and 26b, respectively.

The verifying unit 24b is similar in structure to the verifying unit 24 shown in FIG. 4 except that the verifying unit 24b comprises a signature verifying unit 241b with a first signature format instead of the signature verifying unit 241 in FIG. 4. The signing section 26b is a signing section with a second signature format different from the first signature format.

The first and the second signature formats are different from each other although the signature scheme of the signature verifying unit 241a is identical with that of the signing section 26a. In the example being illustrated, both of the signer's digital signature included in the input document $D_{in}$ and the apparatus's digital signature put on the output document $D_{out}$ are the digital signatures in accordance with the RSA digital signature scheme but either the one or more signer's digital signatures included in the input document $D_{in}$ have the first signature format different from the second signature format of the apparatus's digital signature put on the output document $D_{out}$ or the signer's digital signature included in the input document $D_{in}$ is coded in a coding fashion different from that in the apparatus's digital signature signed on the output document $D_{out}$.

The signature verifying unit 241b receives the input document $D_{in}$, the one or more identified user ID codes, and the one or more identified verification keys from the inputting section 21, the user ID identifying section 22a, and the user verification key holding unit 23, respectively. The signature verifying unit 241b verifies justice of all of the signer's digital signatures included in the input document $D_{in}$ in accordance with the first signature format. The signature verifying unit 241b sends the signature verification result to the verification result indicator message unit 242.

The signing section 26b receives the input document $D_{in}$, the verification result indicator message $M_{vr}$, and the apparatus's signature key from the inputting section 21, the verification result indicator message unit 242, and the apparatus's signature key holding section 25, respectively. The signing section 26b signs both of the input document $D_{in}$ and the verification result indicator message $M_{vr}$ as the object by using the apparatus's signature key to create the signed document in accordance with the second signature format. The signing section 26b may use, as the object, the verification result indicator message $M_{vr}$ alone in place of both of the input document $D_{in}$ and the verification result indicator message $M_{vr}$.

Figure 8:
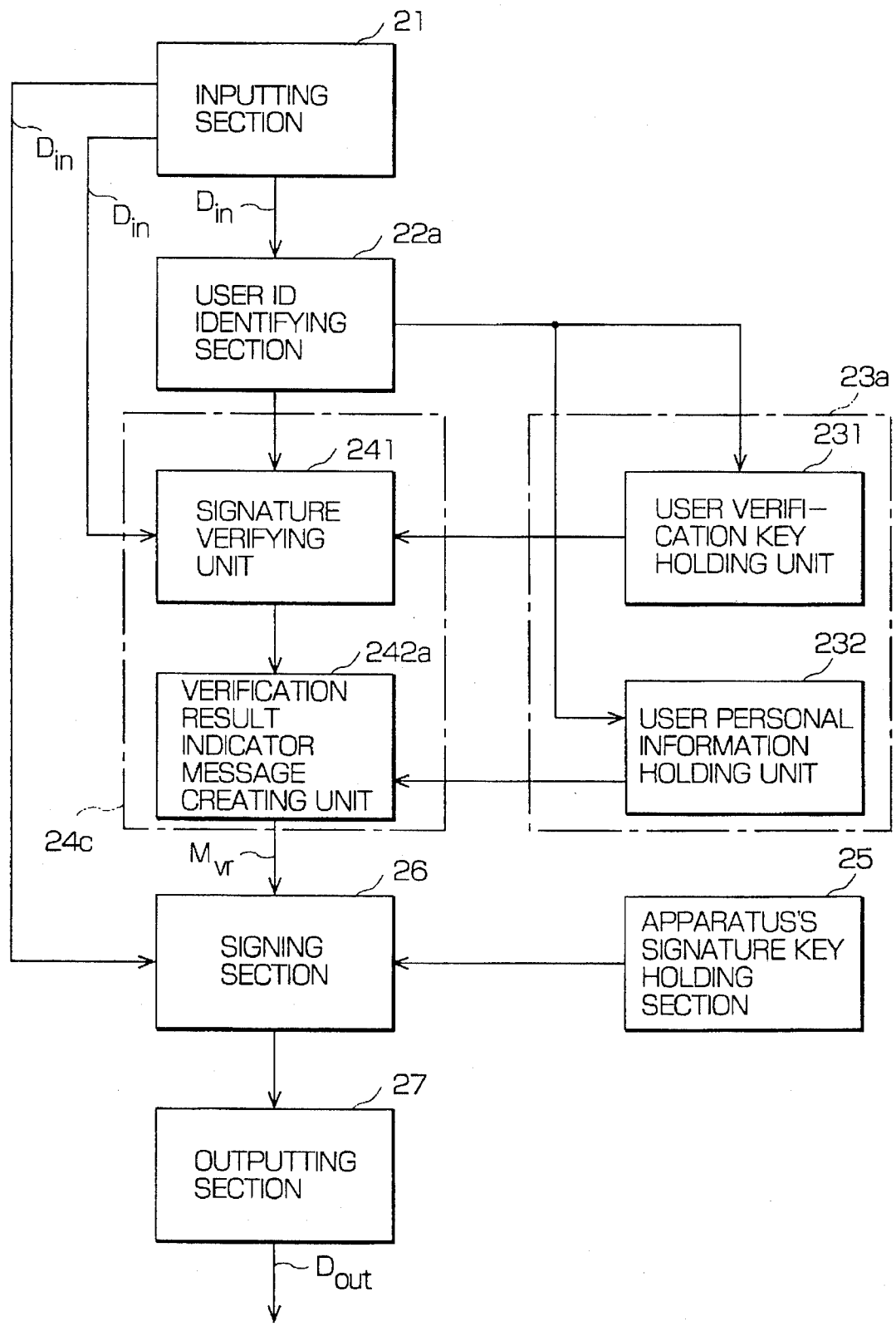
FIG. 8 is a block diagram of signature verification apparatus according to a fifth embodiment of this invention.

Referring to FIG. 8, the description will proceed to signature verification apparatus according to a fifth embodiment of this invention. The illustrated signature verification apparatus is similar in structure to that illustrated in FIG. 4 except that the document related information holding section and the verifying unit are modified to be different from those described in conjunction with FIG. 4 as will later become clear. The document related information holding section and the verifying unit are therefore depicted at 23a and 24c, respectively.

The document related information holding section 23a comprises the user verification key holding unit 231 and a user personal information holding unit 232.

Connected to the user ID identifying section 22a, the user verification key holding unit 231 preliminarily holds, as first ones of the document related information signals, user verification keys for respective user ID codes. Responsive to the one or more identified user ID codes, the user verification key holding unit 231 produces, as a first element of the specified document related information signal, the one or more identified verification keys which are ones of the user verification keys that correspond to the one or more identified use ID codes.

Connected to the user ID identifying section 22a, the user personal information holding unit 232 preliminarily holds, as second ones of the document related information signals, user personal information signals for the respective user ID codes. Responsive to the one or more identified user ID codes, the user personal information holding unit 232 produces, as a second element of the specified document related information signal, one or more identified personal information signals which ones of the user personal information signals correspond to the one or more identified user ID codes.

In the example being illustrated, each of the user personal information signals comprises a user various information signal indicative of a user's real name, an official title such as the chief of a section and a chief clerk, a user's position, the sort of occupation, and so on. It is unnecessary for the user personal information signal to include all of the above-mentioned ones. Of course, the user personal information signal may be restricted to the above-mentioned ones.

The verifying unit 24c is similar in structure to the verifying unit 24 shown in FIG. 4 except that the verification result indicator message creating unit is modified to be different from that described in conjunction with FIG. 4 as will later become clear. The verification result indicator message creating unit is therefore depicted at 242a.

The verification result indicator message creating unit 242a is connected to the signature verifying unit 241 and the user personal information holding unit 232. The verification result indicator message creating unit 242a receives the signature verification result and the one or more identified personal information signals from the signature verifying unit 241 and the user personal information holding unit 232, respectively. The verification result indicator message creating unit 242a rewrites a format of the signature verification result and the one or more identified personal information signals into a format required by the document recipient to create the verification result indicator message indicative of the signature verification result and of the one or more identified personal information signals. The verification result indicator message creating unit 242a sends the verification result indicator message to the signing section 26.

Figure 9:
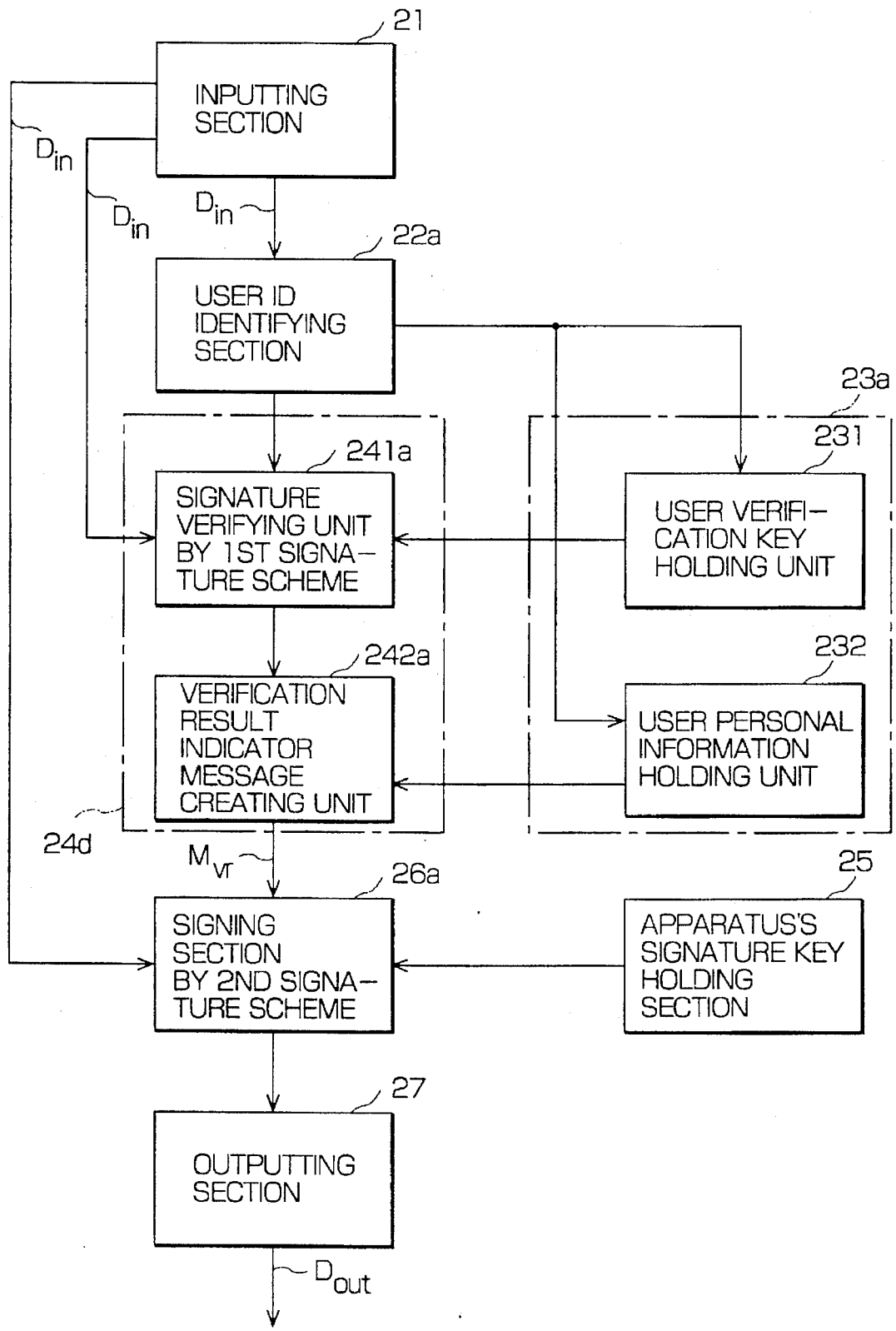
FIG. 9 is a block diagram of signature verification apparatus according to a sixth embodiment of this invention.

Referring to FIG. 9, the description will proceed to a signature verification apparatus according to a sixth embodiment of this invention. The illustrated signature verification apparatus is similar in structure to that illustrated in FIG. 8 except that the verifying unit 24c and the signing section 26 are modified into a verifying unit 24d and the signing section 26a by the second signature scheme. The verifying unit 24d is similar in structure to the verifying unit 24c shown in FIG. 8 except that the verifying unit 24d comprises the signature verifying unit 241a by the first signature scheme instead of the signature verifying unit 241 in FIG. 8.

Figure 10:
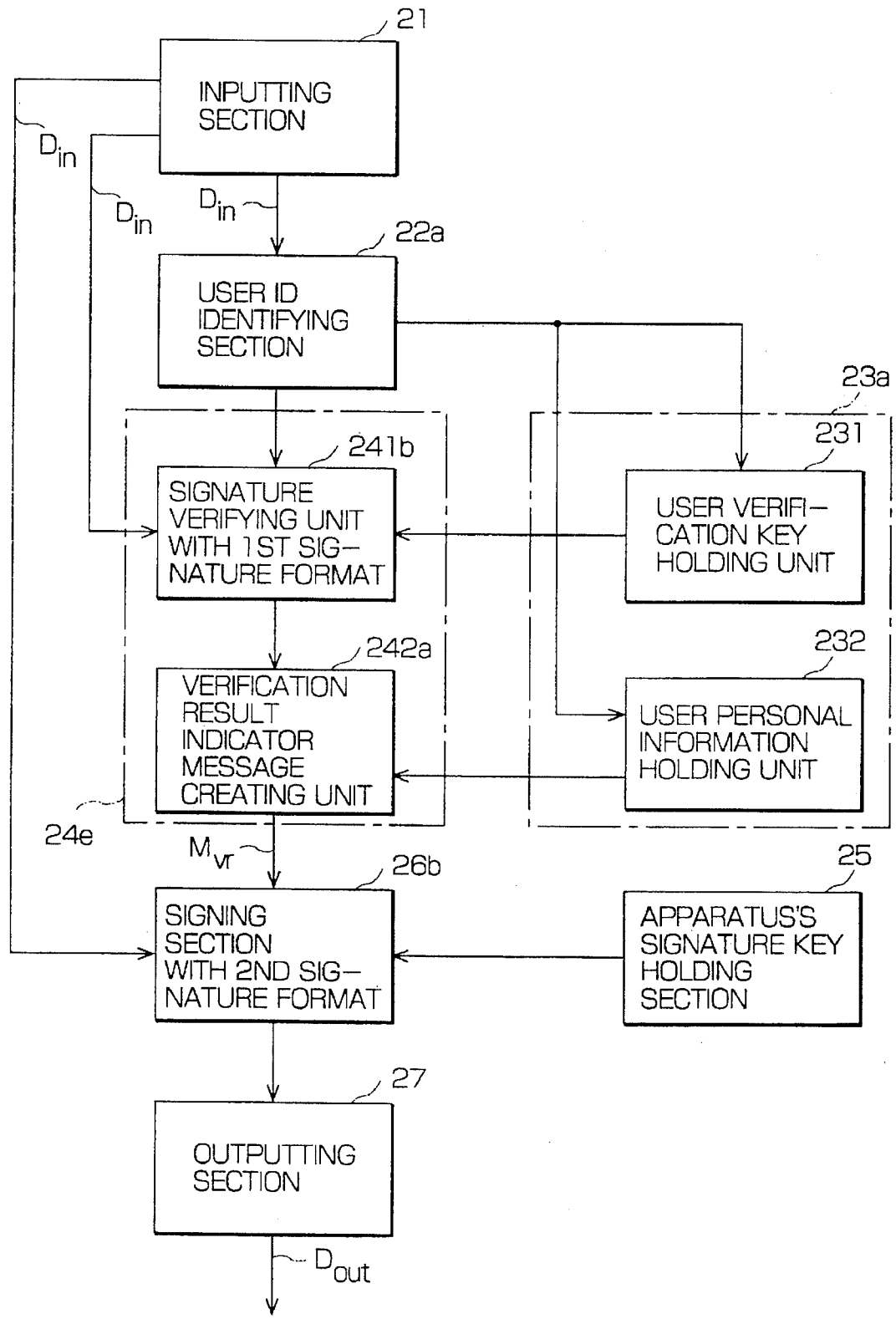
FIG. 10 is a block diagram of signature verification apparatus according to a seventh embodiment of this invention.

Referring to FIG. 10, the description will proceed to a signature verification apparatus according to a seventh embodiment of this invention. The illustrated signature verification apparatus is similar in structure to that illustrated in FIG. 8 except that the verifying unit 24c and the signing section 26 are modified into a verifying unit 24e and the signing section 26b with the second signature format. The verifying unit 24e is similar in structure to the verifying unit 24c shown in FIG. 8 except that the verifying unit 24e comprises the signature verifying unit 241b with the first signature format instead of the signature verifying unit 241 in FIG. 8.

Figure 11:
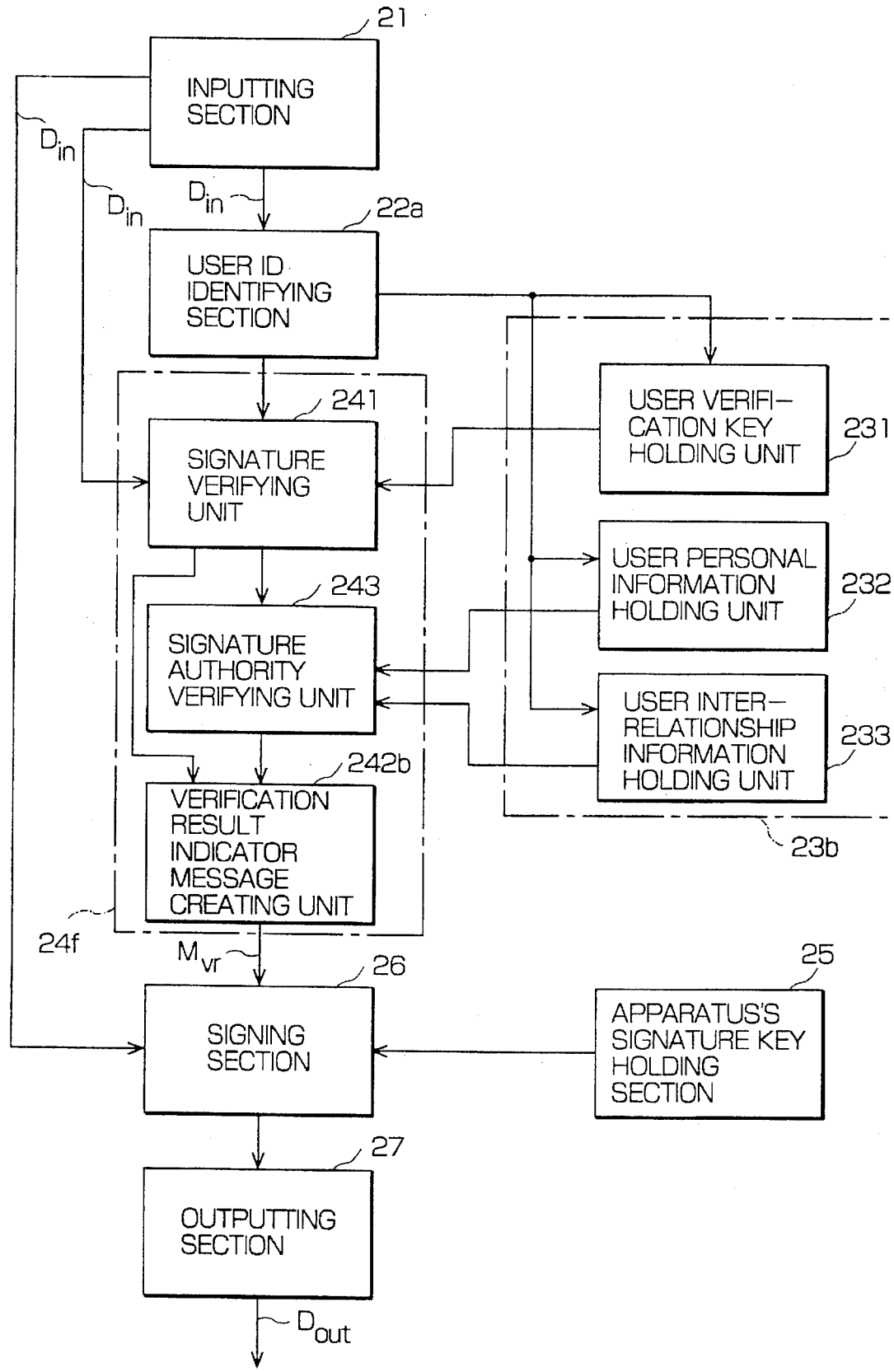
FIG. 11 is a block diagram of signature verification apparatus according to an eighth embodiment of this invention.

Referring to FIG. 11, the description will proceed to signature verification apparatus according to an eighth embodiment of this invention. The illustrated signature verification apparatus is similar in structure to that illustrated in FIG. 4 except that the document related information holding section and the verifying unit are modified to be different from those described in conjunction with FIG. 4 as will later become clear. The document related information holding section and the verifying unit are therefore depicted at 23b and 24f, respectively. In the example being illustrated, a plurality of signer's digital signatures are put on the input document $D_{in}$ by a plurality of signers. As a result, the user ID identifying section 22a produces a plurality of identified user ID codes indicative of signer's user ID codes.

The document related information holding section 23b comprises the user verification key holding unit 231, the user personal information holding unit 232, and a user interrelationship information holding unit 233.

Connected to the user ID identifying section 22a, the user interrelationship information holding unit 233 preliminarily holds, as third ones of the document related information signals, user user interrelationship information signals indicative of interrelations between users. Responsive to the identified user ID codes, the user interrelationship information holding unit 232 produces, as a third element of the specified document related information signal, identified interrelationship information signals which are ones of the user interrelationship information signals that correspond to the identified user ID codes.

The user interrelationship information signal comprises, for example, an information signal indicating that a user A is a superior of a user B or an information signal indicating that the user A is not the superior of the user B in an organization but is the superior of the user B in the imperative system of a special project. Such a information signal is used for verifying validity of the signature in the sense of acknowledgment.

The verifying unit 24f comprises the signature verifying unit 241, a verification result indicator message creating unit 232b, and a signature authority verifying unit 243.

Connected to the inputting section 21, the user ID identifying section 22a, and the user verification key holding unit 231, the signature verifying unit 241 verifies all of the signer's digital signatures included in the input document $D_{in}$ by using the identified verifying keys. The signature verifying unit 241 produces the signature verification result as one element to the verification result.

The signature authority verifying unit 243 is connected to the signature verifying unit 241, the user personal information holding unit 232, and the user interrelationship information holding unit 233. The signature authority verifying unit 243 receives the signature verification result, the identified personal information signals, and the identified interrelationship information signals from the signature verifying unit 241, the user personal information holding unit 232, and the user interrelationship information holding unit 233, respectively. On signature verification of the input document $D_{in}$ signed by the signers, the signature authority verifying unit 243 verifies whether or not the signers are justice with reference to the identified interrelationship information signals on the basis of the identified personal information signals. In other words, the signature authority verifying unit 243 verifies whether or not the signature verification result is contradictory to both of the identified personal information signals and the identified interrelationship information signals. The signature authority verifying unit 243 produces a signature authority verification result as another element of the verification result.

Herein, the signature authority verification result may include the identified personal information signals and/or the identified interrelationship information signals. In addition, the signature authority verification result may include one or ones selected from the identified personal information signals and the identified interrelationship information signals which the signature authority verifying unit 243 receives. For example, the signature authority verifying unit 243 may extract required one or ones from the identified personal information signals to make the required one or ones included in the signature authority verification result.

Connected to the signature verifying unit 241 and the signature authority verifying unit 243, the verification result indicator message creating unit 242b creates the verification result indicator message $M_{vr}$ indicative of the signature verification result and of the signature authority verification result.

Figure 12:
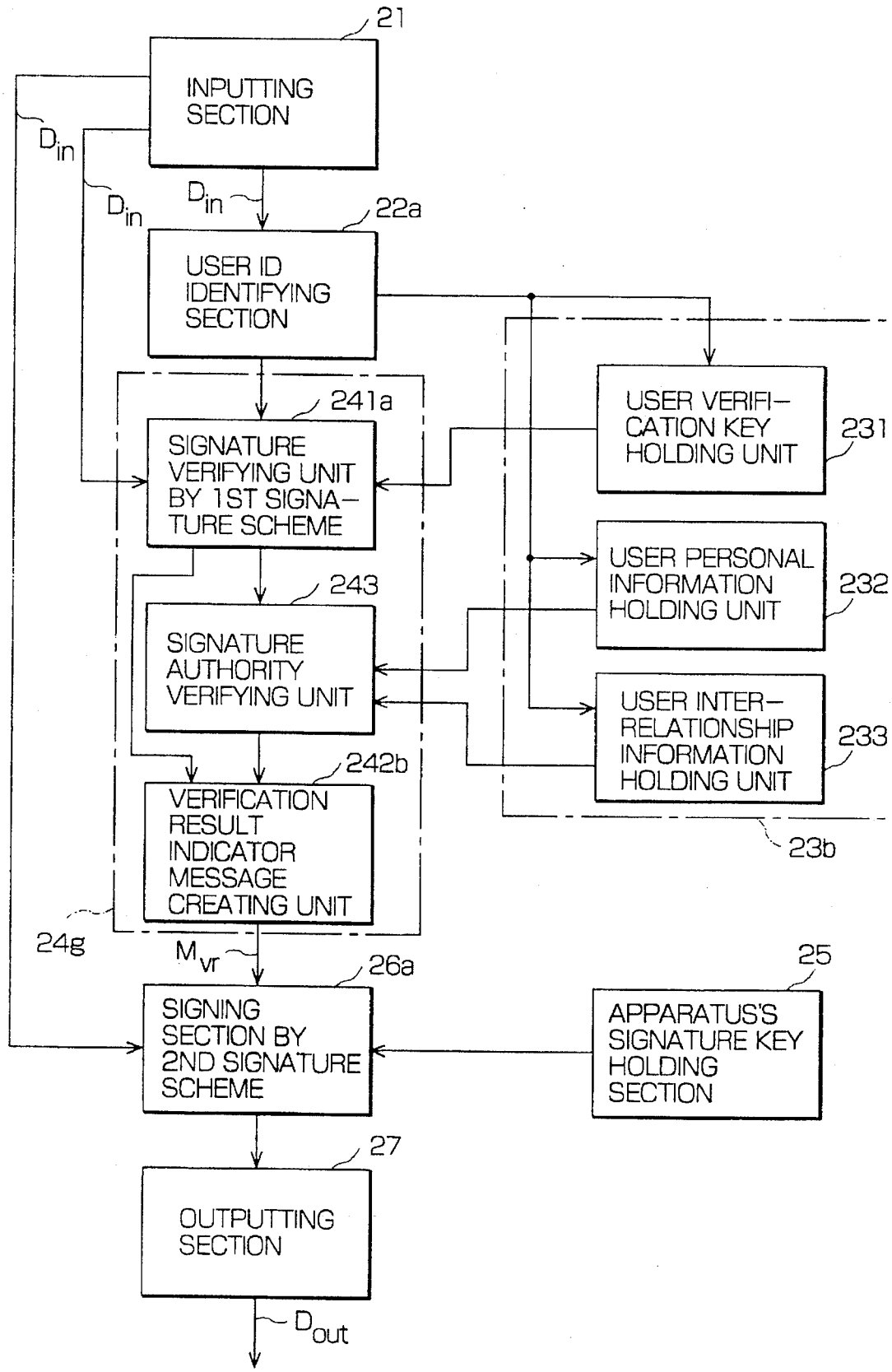
FIG. 12 is a block diagram of signature verification apparatus according to a ninth embodiment of this invention.

Referring to FIG. 12, the description will proceed to a signature verification apparatus according to a ninth embodiment of this invention. The illustrated signature verification apparatus is similar in structure to that illustrated in FIG. 11 except that the verifying unit 24f and the signing section 26 are modified into a verifying unit 24g and the signing section 26a by the second signature scheme. The verifying unit 24g is similar in structure to the verifying unit 24f shown in FIG. 11 except that the verifying unit 24g comprises the signature verifying unit 241a by the first signature scheme instead of the signature verifying unit 241 in FIG. 11.

Figure 13:
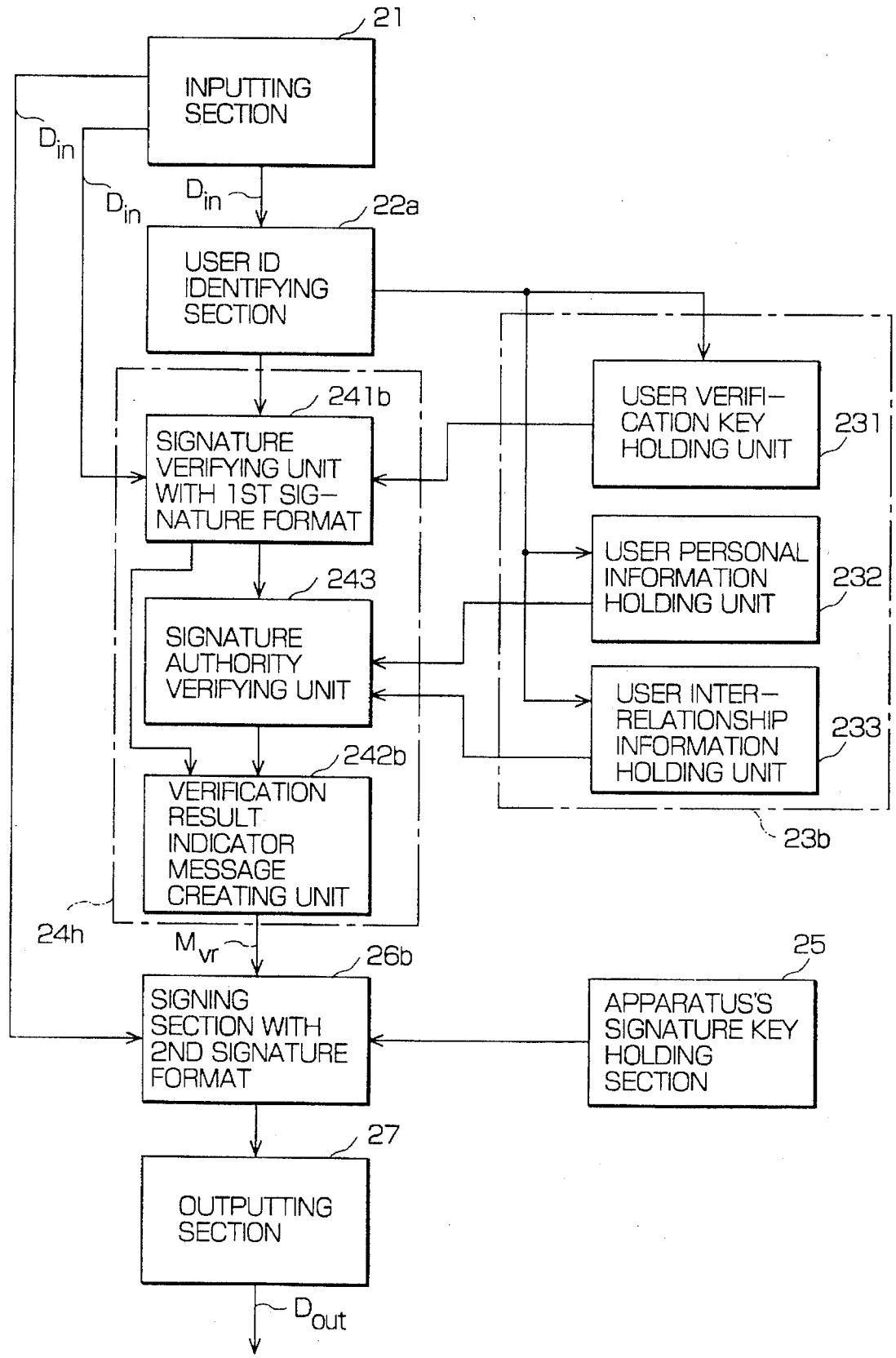
FIG. 13 is a block diagram of signature verification apparatus according to a tenth embodiment of this invention.

Referring to FIG. 13, the description will proceed to a signature verification apparatus according to a tenth embodiment of this invention. The illustrated signature verification apparatus is similar in structure to that illustrated in FIG. 11 except that the verifying unit 24f and the signing section 26 are modified into a verifying unit 24h and the signing section 26b with the second signature format. The verifying unit 24h is similar in structure to the verifying unit 24f shown in FIG. 11 except that the verifying unit 24g comprises the signature verifying unit 241b with the first signature format instead of the signature verifying unit 241 in FIG. 11.

Figure 14:
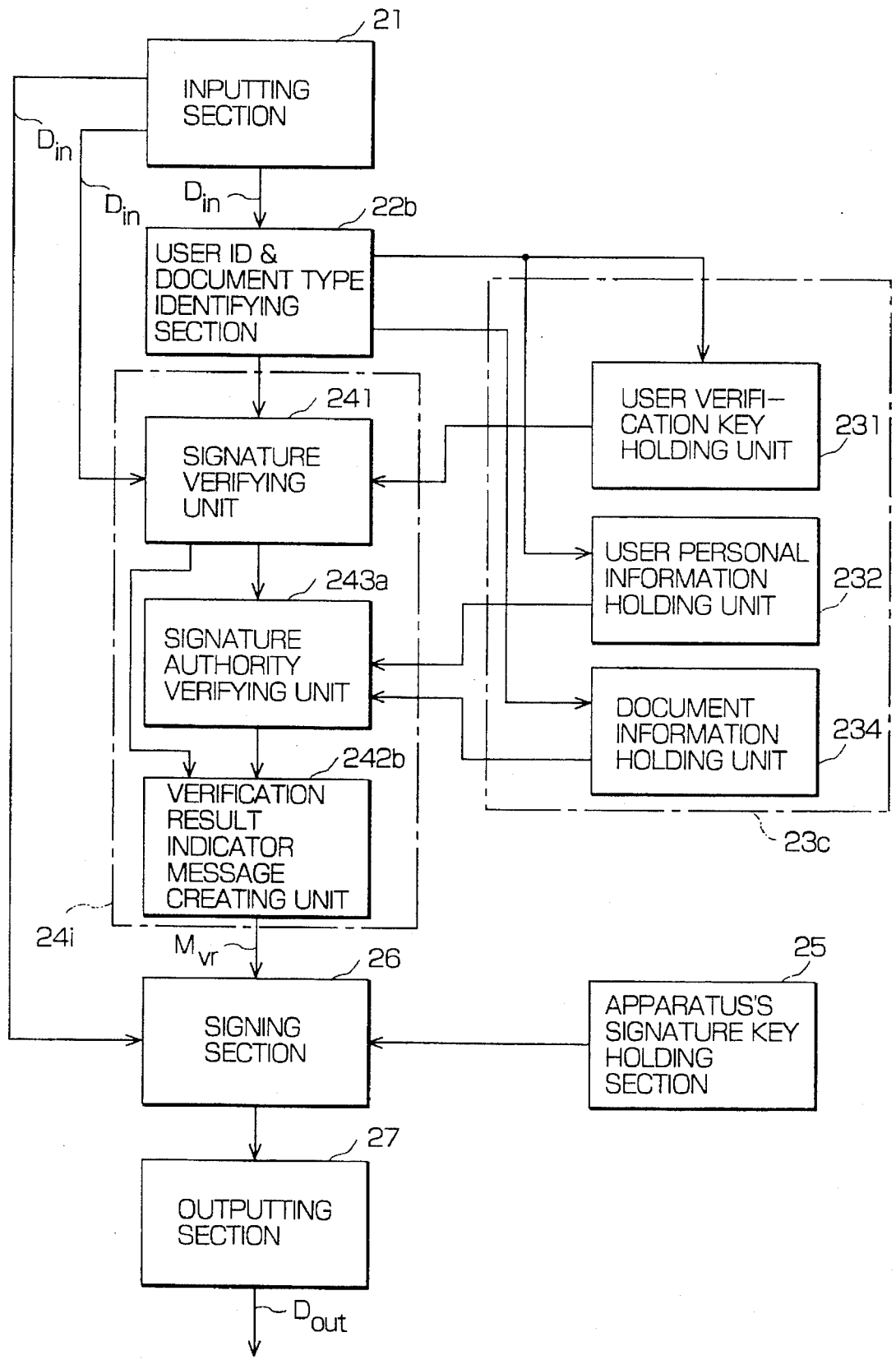
FIG. 14 is a block diagram of signature verification apparatus according to an eleventh embodiment of this invention.

Referring to FIG. 14, the description will proceed to a signature verification apparatus according to an eleventh embodiment of this invention. The illustrated signature verification apparatus is similar in structure to that illustrated in FIG. 4 except that the identifying section, the document related information holding section, and the verifying unit are modified to be different from those described in conjunction with FIG. 4 as will later become clear. The identifying section, the document related information holding section, and the verifying unit are therefore depicted at 22b, 23c, and 24i, respectively.

The identifying section 22b is a user ID and document type identifying section. The user ID and document type identifying section 22b is supplied with the input document $D_{in}$ from the inputting section 21. The user ID and document type identifying section 22b identifies or extracts, as the document peculiar information, a combination of the one or more signer's user ID codes in the input document $D_{in}$ and document type information indicative of a document type of the input document $D_{in}$. The user ID and document type identifying section 22b produces, as the identified document peculiar information signal, a combination of the one or more identified user ID codes indicative of the one or more signer's user ID codes and an identified document type signal indicative the document type information.

The document related information holding section 23c comprises the user verification key holding unit 231, the user personal information holding unit 232, and a document information holding unit 234.

Connected to the user ID and document type identifying section 22b, the document information holding unit 234 preliminarily holds, as third ones of the document related information signals, document information signals for respective document types. The document information holding unit 234 produces, as a third element of the specified document related information signal, an identified document information signal which is one of the document information signals that corresponds to the identified document type signal.

Each of the document information signals has a signature list for the signature required in the document in question and/or a personal list for ones required in the personal information signals. The document signal may include information independent of the signature such as symbolic convention of the document in question. The signature list is, for example, the signature of a drafter and its superiors up to at least a section chief, the signature of a specific post such as the chief of the accountant's division. Inasmuch as required acknowledgment is normally defined in a rule for each document used in the organization, the document information signal may represent such a rule. The rule is, for example, that a signature of the chief of the section is required for a notice of holiday or that signatures of the drafter, a chief clerk, a section chief, the head of a division, the head of an accountant's division, and the head of an engineering division are required for a drafting note.

The verifying unit 24i comprises the signature verifying unit 241, the verification result indicator message creating unit 242b, and a signature authority verifying unit 243a.

The signature authority verifying unit 243a is connected to the signature verifying unit 241, the user personal information holding unit 232, and the document information holding unit 234. The signature authority verifying unit 243a receives the signature verification result, the one or more identified personal information signals, and the identified document information signal from the signature verifying unit 241, the user personal information holding unit 232, and the document information holding unit 234, respectively. On signature verification, the signature authority verifying unit 243a verifies the presence or absence of the signature verification for a signed user on the basis of the one or more identified personal information signals and of the identified document information signal. In other words, the signature authority verifying unit 243a verifies whether or not the signature verification result is contradictory to both of the one or more identified personal information signals and the identified document information signal. The signature authority verifying unit 243a produces a signature authority verification result as another element of the verification result.

Figure 15:
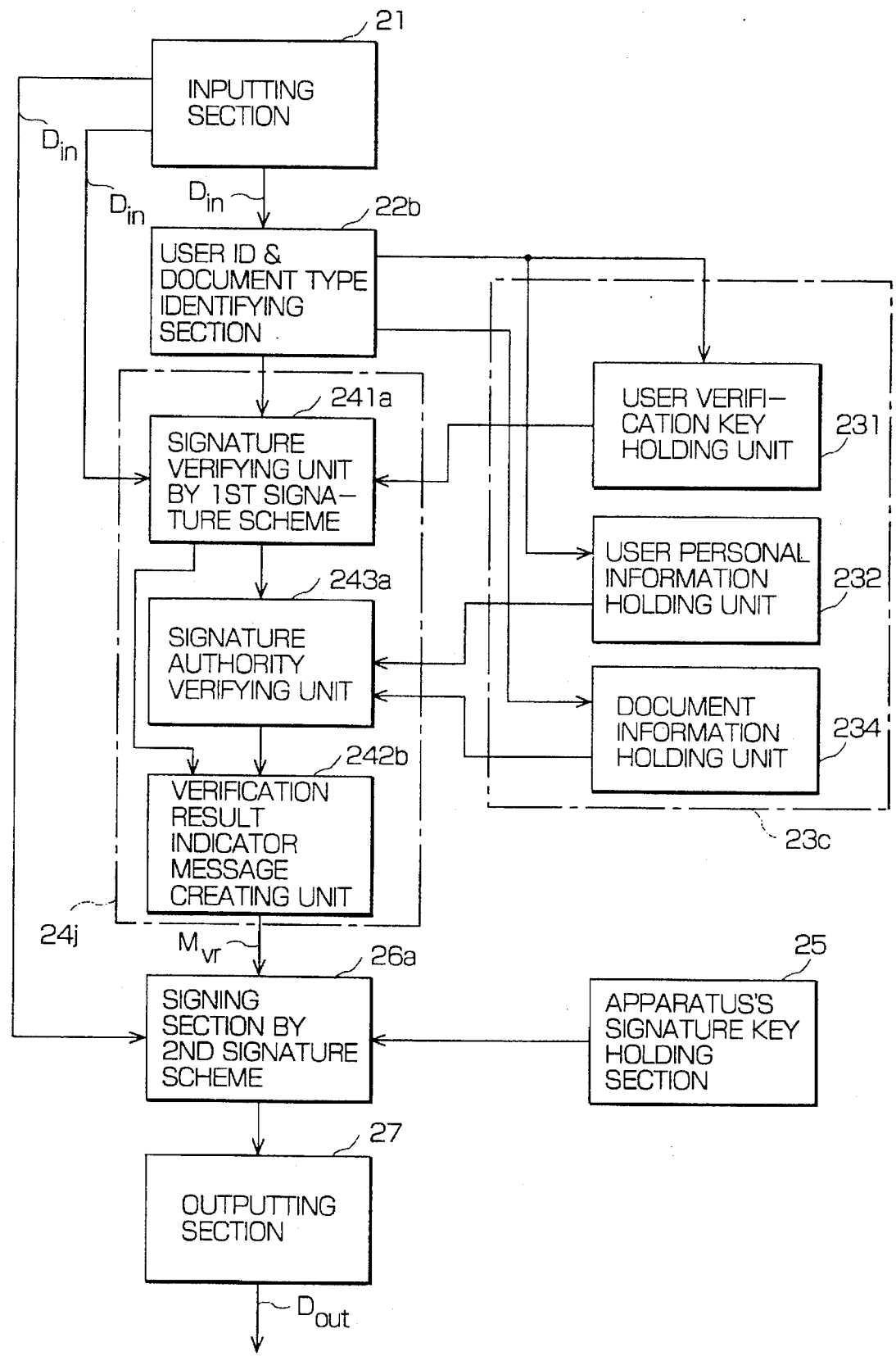
FIG. 15 is a block diagram of signature verification apparatus according to a twelfth embodiment of this invention.

Referring to FIG. 15, the description will proceed to a signature verification apparatus according to a twelfth embodiment of this invention. The illustrated signature verification apparatus is similar in structure to that illustrated in FIG. 14 except that the verifying unit 24i and the signing section 26 are modified into a verifying unit 24j and the signing section 26a by the second signature scheme. The verifying unit 24j is similar in structure to the verifying unit 24i shown in FIG. 14 except that the verifying unit 24j comprises the signature verifying unit 241a by the first signature scheme instead of the signature verifying unit 241 in FIG. 14.

Figure 16:
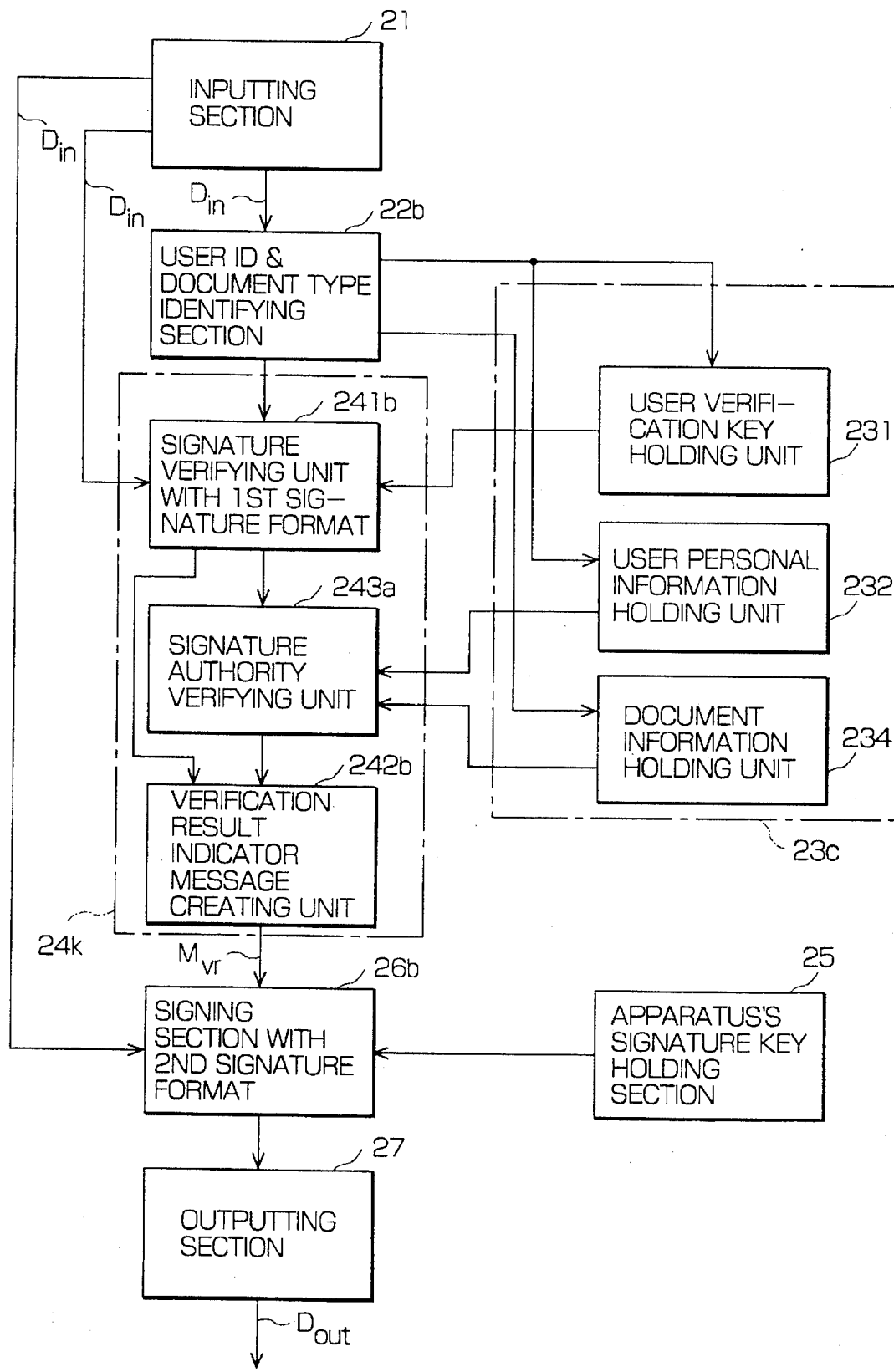
FIG. 16 is a block diagram of signature verification apparatus according to a thirteenth embodiment of this invention.

Referring to FIG. 16, the description will proceed to a signature verification apparatus according to a thirteenth embodiment of this invention. The illustrated signature verification apparatus is similar in structure to that illustrated in FIG. 14 except that the verifying unit 24i and the signing section 26 are modified into a verifying unit 24k and the signing section 26b with the second signature format. The verifying unit 24k is similar in structure to the verifying unit 24i shown in FIG. 14 except that the verifying unit 24k comprises the signature verifying unit 241b with the first signature format instead of the signature verifying unit 241 in FIG. 14.

Figure 17:
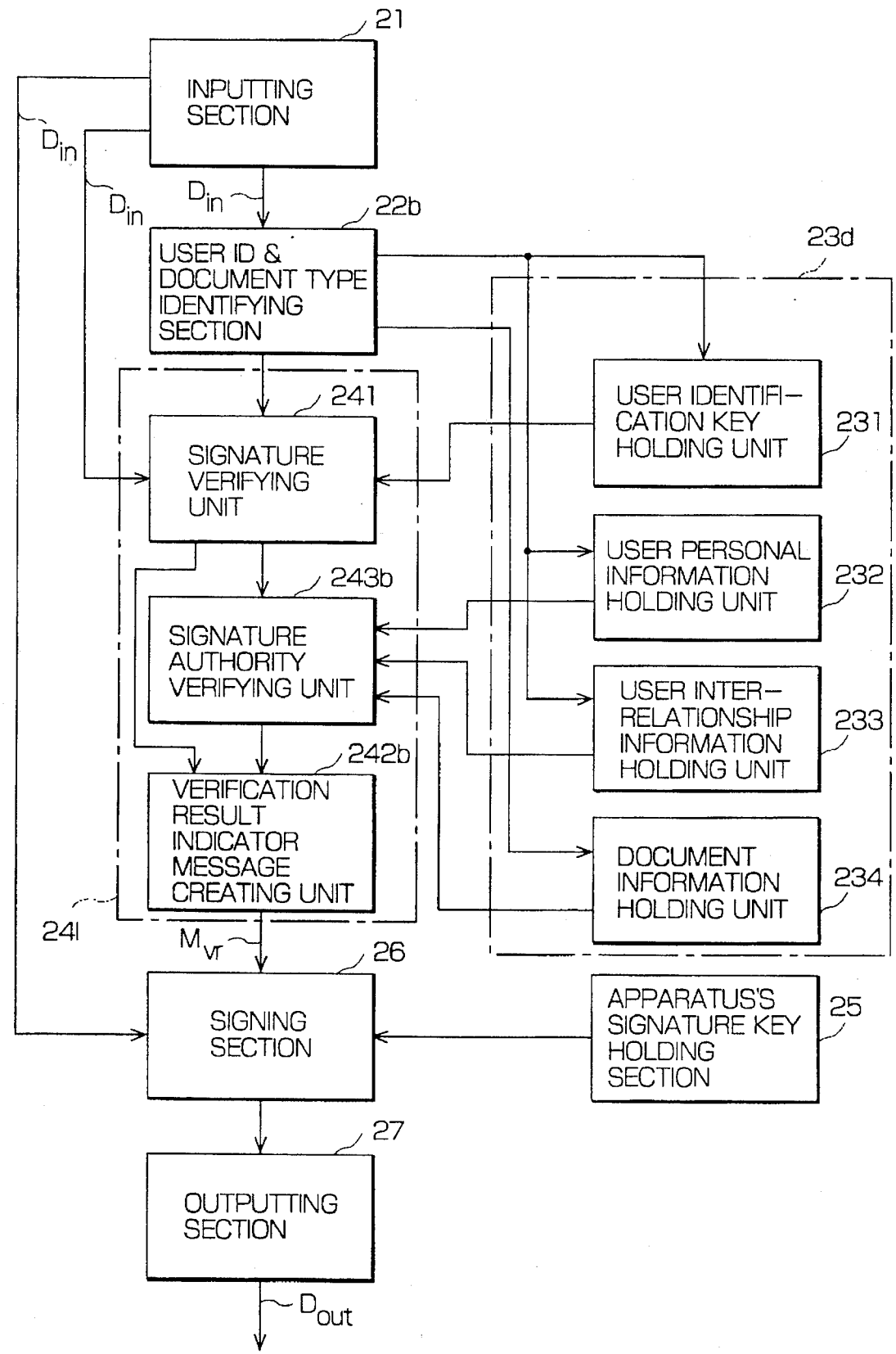
FIG. 17 is a block diagram of signature verification apparatus according to a fourteenth embodiment of this invention.

Referring to FIG. 17, the description will proceed to a signature verification apparatus according to a fourteenth embodiment of this invention. The illustrated signature verification apparatus comprises the inputting section 21, the user ID and document type identifying section 22b, a document related information holding section 23d, a verifying unit 24l, the apparatus's signature key holding section 25, the signing section 26, the outputting section 27. That is, the illustrated Signature verification apparatus corresponds to a combination of the signature verification apparatus illustrated in FIG. 11 and the signature verification apparatus illustrated in FIG. 14. In the example being illustrated, a plurality of signer's digital signatures are put on the input document $D_{in}$ by a plurality of signers. As a result, the user ID and document type identifying section 22b produces a plurality of identified ID codes indicative of signer's ID codes.

The document related information holding section 23d comprises the user verification key holding unit 231, the user personal information holding unit 232, and the user interrelationship information holding unit 233, and the document information holding unit 234.

Connected to the user ID and document type identifying section 22b, the user interrelationship information holding unit 233 preliminarily holds, as third ones of the document related information signals, the user interrelationship information signals indicative of interrelations between users. Responsive to the identified user ID codes, the user interrelationship information holding unit 233 produces, as a third element of the specified document related information signal, identified interrelationship information signals which are ones of the user interrelationship information signals that correspond to the identified user ID code.

Connected to the user ID and document type identifying section 22b, the document information holding unit 234 preliminarily holds, as fourth ones of the document related information signals, document information signals for respective document types. The document information holding unit 234 produces, as a fourth element of the specified document related information signal, an identified document information signal which is one of the document information signals that corresponds to the identified document type signal.

The verifying unit 24l comprises the signature verifying unit 241, the verification result indicator message creating unit 232b, and a signature authority verifying unit 243b.

The signature authority verifying unit 243b is connected to the signature verifying unit 241, the user personal information holding unit 232, the user interrelationship information holding unit 233, and the document information holding unit 234. The signature authority verifying unit 243b receives the signature verification result, the identified personal information signals, the identified interrelationship information signals, and the identified document information signal from the signature verifying unit 241, the user personal information holding unit 232, the user interrelationship information holding unit 233, and the document information holding unit 234, respectively. On signature verification of the input document $D_{in}$ signed by the signers, the signature authority verifying unit 243b verifies whether or not the signers are justice with reference to the identified interrelationship information signals on the basis of the identified personal information signals and of the identified document information signal. In other words, the signature authority verifying unit 243b verifies whether or not the signature verification result is contradictory to all three of the identified personal information signals, the identified interrelationship information signals, and the identified document information signal.

The signature authority verifying unit 243b performs verification regarding things such as:

(1) whether or not a plurality of signers sign in good order and with correct relation. For instance, for signing by a person in charge and a chief clerk, whether or not the chief clerk signs after the person in charge signs and whether or not the chief clerk is a superior of the person in charge; and (2) whether or not signatures required in a document are perfect. For instance, regarding the document requiring acknowledgment up to the chief of a section, whether or not a finally signing person is the chief of the section or his or her superior. Regarding the document requiring acknowledgment of both the head of an accountant's division and the head of an engineering division, whether or not signatures of both heads are perfect.

Figure 18:
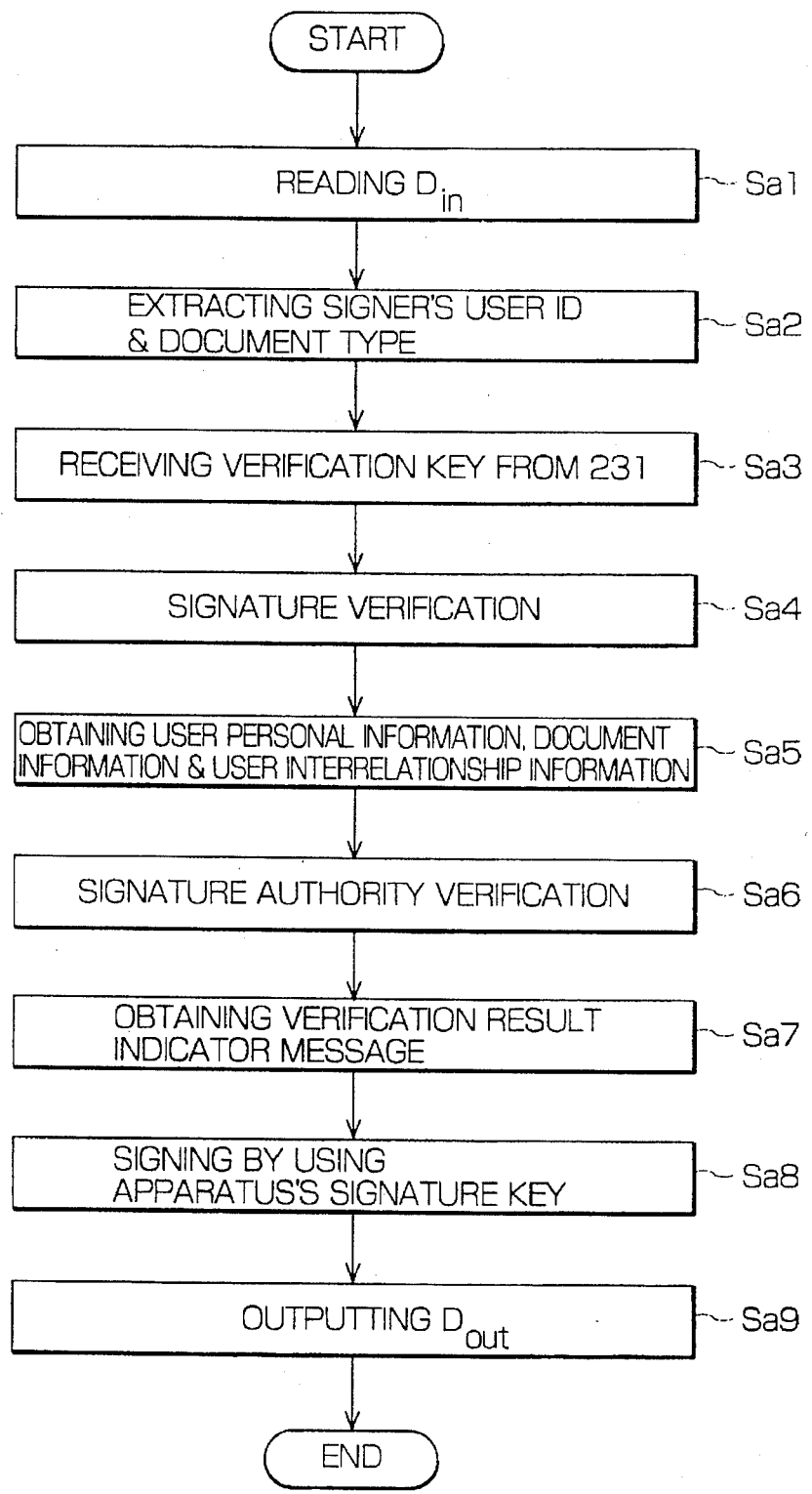
FIG. 18 shows a flow chart for use in describing operation of the signature verification apparatus illustrated in FIG. 17.

Referring to FIG. 18 in addition to FIG. 17, description will be made as regards operation of the signature verification apparatus illustrated in FIG. 17.

At first, the inputting section 21 reads or inputs the input document $D_{in}$ as shown at a first stage Sa1. The inputting section 21 sends the input document $D_{in}$ to the user ID and document type identifying section 22b, the signature verifying unit 241, and the signing section 26. The first stage Sa1 is followed by a second stage Sa2 at which the user ID and document type identifying section 22b extracts or identifies all of the signer's user ID codes included in the input document $D_{in}$ and the document type information of the input document $D_{in}$. The user ID and document type identifying section 22b sends the identified user ID codes to the signature verifying unit 241, the user verification key holding unit 231, the user personal information holding unit 232, and the user interrelationship information unit 233. In addition, the user ID and document type identifying section 22b sends the identified document type signal to the document information holding unit 234. The second stage Sa2 proceeds to a third stage Sa3 at which the user verification key holding unit 231 sends, in response to the identified user ID codes, the identified verification keys to the signature verifying unit 241. In other words, the signature verifying unit 241 receives the identified verification keys from the user verification key holding unit 231.

The third stage Sa3 is succeeded by a fourth stage Sa4 at which the signature verifying unit 241 verifies all of the signer's digital signatures included in the input document $D_{in}$ by using the identified verification keys. The signature verifying unit 241 sends the signature verification result to the signature authority verifying unit 243b and the verification result indicator message creating unit 242b. Responsive to the identified user ID codes, the user personal information holding unit 232 sends the identified personal information signals to the signature authority verifying unit 243b. Responsive to the identified user ID codes, the user interrelationship information unit 233 sends the identified interrelationship information signals to the signature authority verifying unit 243b. Responsive to the identified document type signal, the document information holding unit 234 sends the identified document information signal to the signature authority verifying unit 243b.

The fourth stage Sa4 is followed by a fifth stage Ss5 at which the signature authority verifying unit 243b receives or obtains the signature verification result, the identified personal information signals, the identified interrelationship information signals, and the identified document information signal from the signature verifying unit 241, the user personal information holding unit 232, the user interrelationship information unit 233, and the document information holding unit 234, respectively.

The fifth stage Sa5 proceeds to a sixth stage Sa6 at which the signature authority verifying unit 243b verifies whether or not the signature verification result is contradictory to all three of the identified personal information signals, the identified interrelationship information signals, and the identified document information signal. The signature authority verifying unit 243b sends the signature authority verification result to the verification result indicator message creating unit 242b.

The verification result indicator message creating unit 242b receives, as the verification result, the signature verification result and the signature authority verification result from the signature verifying unit 241 and the the signature authority verifying unit 243b, respectively.

The sixth stage Sa6 is succeeded by a seventh stage Sa7 at which the verification result indicator message creating unit 242b rewrites a format of the verification result into a format required by the document recipient to create the verification result indicator message indicative of the verification result. The verification result indicator message creating unit 242b sends the verification result indicator message $M_{vr}$ to the signing section 26. The apparatus's signature key holding section 25 sends the apparatus's signature key to the signing section 26. The signing section 26 receives the input document $D_{in}$, the verification result indicator message $M_{vr}$ and the apparatus's signature key from the inputting section 21, the verification result indicator message creating unit 242b, and the apparatus's signature key holding section 25, respectively.

The seventh stage Sa7 is followed by an eighth stage Sa8 at which the signing section 26 signs both the input document $D_{in}$ and the verification result indicator message $M_{vr}$ as object by using the apparatus's signature key. The signing section 26 may sign only the verification result indicator message as the object by using the apparatus's signature key. The signing section 26 sends the signed document to the outputting section 27. The eighth stage Sa8 is succeeded by a ninth stage Sa9 at which the outputting section 27 outputs the singed document as the output document $D_{out}$.

Figure 19:
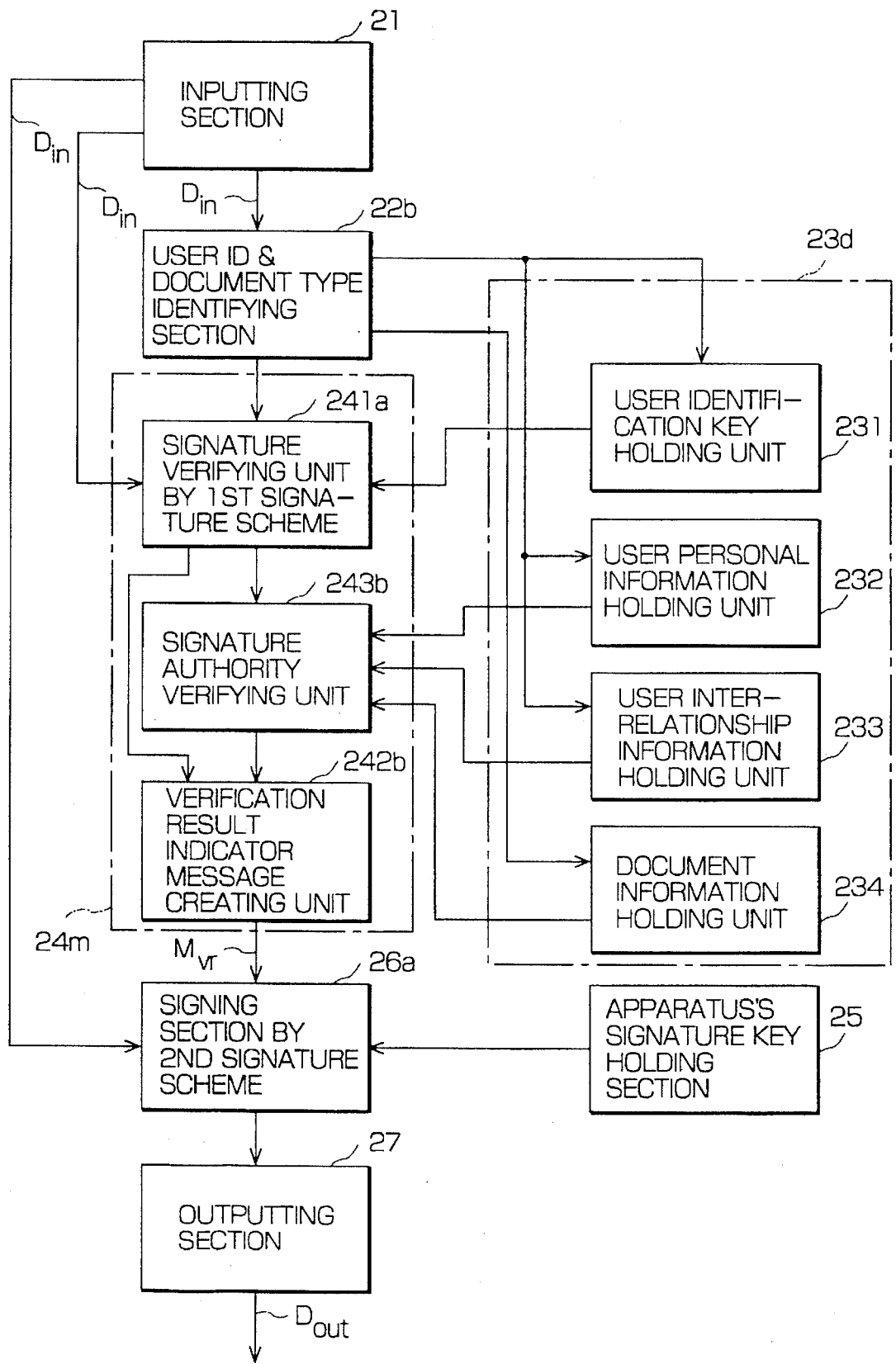
FIG. 19 is a block diagram of signature verification apparatus according to a fifteenth embodiment of this invention.

Referring to FIG. 19, the description will proceed to a signature verification apparatus according to a fifteenth embodiment of this invention. The illustrated signature verification apparatus is similar in structure to that illustrated in FIG. 17 except that the verifying unit 24l and the signing section 26 are modified into a verifying unit 24m and the signing section 26a by the second signature scheme. The verifying unit 24m is similar in structure to the verifying unit 24l shown in FIG. 17 except that the verifying unit 24m comprises the signature verifying unit 241a by the first signature scheme instead of the signature verifying unit 241 in FIG. 17.

Figure 20:
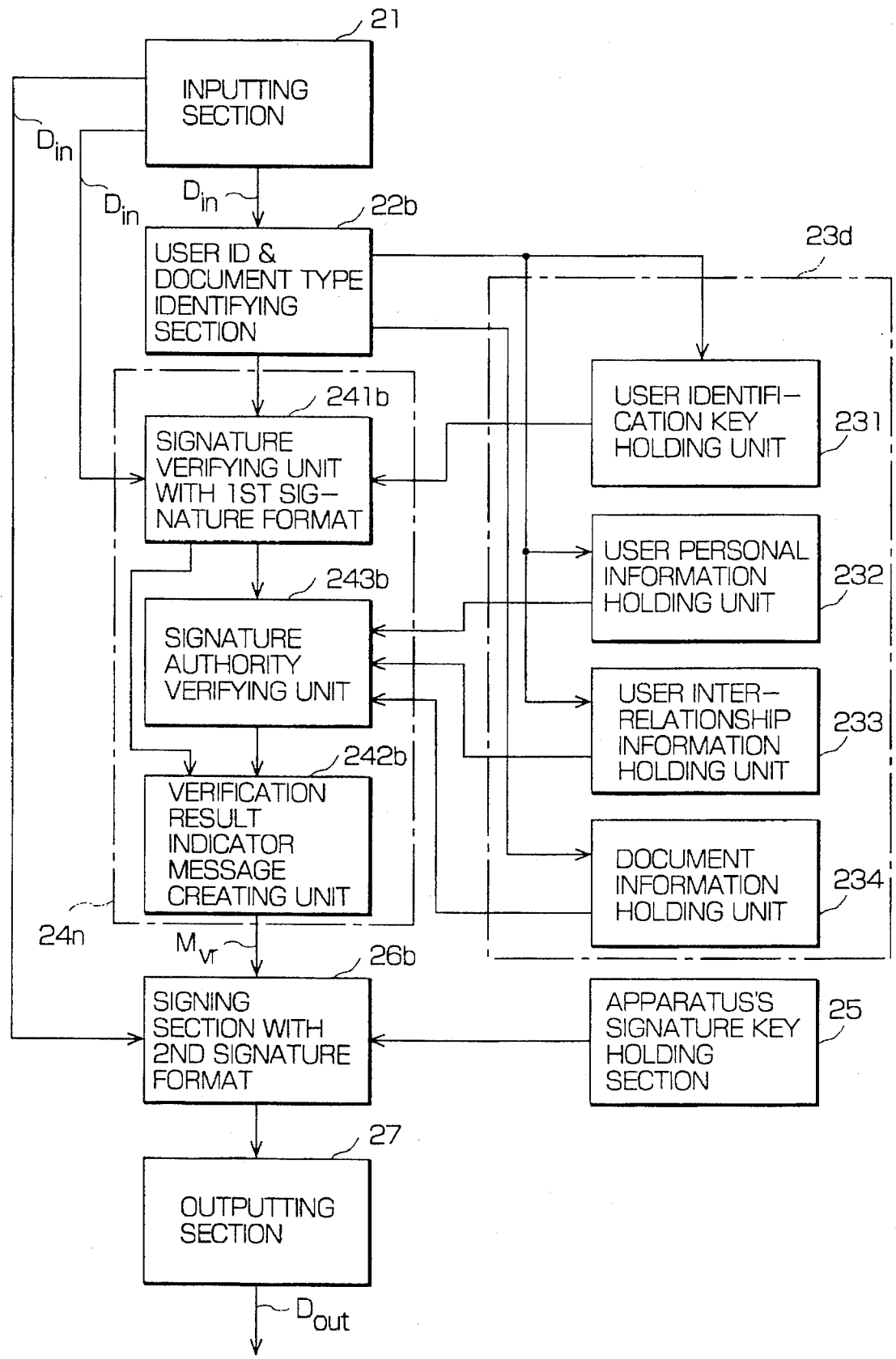
FIG. 20 is a block diagram of signature verification apparatus according to a sixteenth embodiment of this invention.

Referring to FIG. 20, the description will proceed to a signature verification apparatus according to a sixteenth embodiment of this invention. The illustrated signature verification apparatus is similar in structure to that illustrated in FIG. 17 except that the verifying unit 24l and the signing section 26 are modified into a verifying unit 24n and the signing section 26b with the second signature format. The verifying unit 24n is similar in structure to the verifying unit 24l shown in FIG. 17 except that the verifying unit 24n comprises the signature verifying unit 241b with the first signature format instead of the signature verifying unit 241 in FIG. 17.

While this invention has thus far been described in conjunction with the embodiments thereof, it will now be readily possible for those skilled in the art to put this invention into practice in various other manners.

What is claimed is:

1. Apparatus for performing signature verification for an input document on which at least one digital signature is put by at least one signer, said apparatus comprising:

inputting means for inputting the input document;

identifying means, connected to said inputting means, for identifying document peculiar information included in the input document to produce an identified document peculiar information signal indicative of the document peculiar information;

document related information holding means, connected to said identifying means, for preliminarily holding a plurality of document related information signals to produce, as a specified document related information signal, one of the document related information signals that corresponds to the identified document peculiar information signal;

verifying means, connected to said inputting means and said document related information holding means, for verifying the digital signature in the input document by using the specified document related information signal to produce a verification result indicator message indicative of a verification result;

signature key holding means for holding an apparatus's signature key assigned to said apparatus;

signing means, connected to said inputting means, said verifying means, and said signature key holding means, for signing at least the verification result indicator message by using the signature key to produce a signed document; and outputting means, connected to said signing means, for outputting the signed document as an output document.

2. Apparatus as claimed in claim 1, the signer being assigned with a signer's user ID code, wherein said identifying means comprises a user ID code identifying section for identifying, as the document peculiar information, the signer's user ID code in the input document to produce, as the identified document peculiar information signal, an identified user ID code indicative of the signer's user ID code.

3. Apparatus as claimed in claim 2, wherein said document related information holding means comprises a user verification key holding unit for preliminarily holding, as the document related information signals, user verification keys for respective user ID codes to produce, as the specified document related information signal, an identified verification key which is one of the user verification keys that corresponds to the identified user ID code.

4. Apparatus as claimed in claim 3, wherein said verifying means comprises:

a signature verifying unit, connected to said inputting means and said user verification key holding unit for verifying the digital signature in the input document by using the identified verification key to produce a signature verification result as the verification result; and a verification result indicator message creating unit, connected to said signature verifying unit, for creating the verification result indicator message indicative of the signature verification result.

5. Apparatus as claimed in claim 4, wherein said signature verifying unit verifies the digital signature by a first signature scheme, said signing means signing by a second signature scheme different from the first signature scheme.

6. Apparatus as claimed in claim 5, wherein the first signature scheme is one of RSA and DSA digital signature schemes, the second signature scheme being another of the RSA and DSA digital signature schemes.

7. Apparatus as claimed in claim 4, wherein said signature verifying unit verifies the digital signature with a first signature format, said signing means signing with a second signature format different from the first signature format.

8. Apparatus as claimed in claim 2, wherein said document related information holding means comprises:

a user verification key holding unit, connected to said user ID code identifying section, for preliminarily holding, as first ones of the document related information signals, user verification keys for respective user ID codes to produce, as a first element of the specified document related information signal, an identified verification key which is one of the user verification keys that corresponds to the identified user ID code; and a user personal information holding unit, connected to said user ID identifying section, for preliminarily holding, as second ones of the document related information signals, user personal information signals for the respective user ID codes to produce, as a second element of the specified document related information signal, an identified personal information signal which is one of the user personal information signals that corresponds to the identified user ID code.

9. Apparatus as claimed in claim 8, wherein said verifying means comprises:

a signature verifying unit, connected to said inputting means and said user verification key holding unit, for verifying the digital signature in the input document by using the identified verification key to produce a signature verification result as the verification result; and a verification result indicator message creating unit, connected to said signature verifying unit and said user personal information holding unit, for creating the verification result indicator message indicative of the signature verification result and of the identified personal information signal.

10. Apparatus as claimed in claim 9, wherein said signature verifying unit verifies the digital signature by a first signature scheme, said signing means signing by a second signature scheme different from the first signature scheme.

11. Apparatus as claimed in claim 10, wherein the first signature scheme is one of RSA and DSA digital signature schemes, the second signature scheme being another of the RSA and DSA digital signature schemes.

12. Apparatus as claimed in claim 9, wherein said signature verifying unit verifies the digital signature with a first signature format, said signing means signing with a second signature format different from the first signature format.

13. Apparatus as claimed in claim 2, wherein a plurality of digital signatures are put on the input document by a plurality of signers, said user ID identifying section producing identified user ID codes indicative of signer's user ID codes, wherein said document related information holding means comprises:

a user verification key holding unit, connected to said user ID identifying section, for preliminarily holding, as first ones of the document related information signals, user verification keys for respective user ID codes to produce, as first elements of the specified document related information signal, identified verification keys which are ones of the user verification keys that correspond to the identified user ID codes;

a user personal information holding unit, connected to said user ID identifying section, for preliminarily holding, as second ones of the document related information signals, user personal information signals for the respective user ID codes to produce, as second elements of the specified document related information signal, identified personal information signals which are ones of the user personal information signals that correspond to the identified user ID codes; and a user interrelationship information holding unit, connected to said user ID identifying section, for preliminarily holding, as third ones of the document related information signals, user interrelationship information signals indicative of interrelations between users to produce, as third elements of the specified document related information signal, identified interrelationship information signals which are ones of the user interrelationship information signals that correspond to the identified user ID codes.

14. Apparatus as claimed in claim 13, wherein said verifying means comprises:

a signature verifying unit, connected to said inputting means, said user ID identifying section, and said user verification key holding unit, for verifying the digital signatures in the input document by using the identified verification keys to produce a signature verification result as one element of the verification result;

a signature authority verifying unit, connected to said signature verifying unit, said user personal information holding unit, and said user interrelationship information holding unit, for verifying whether or not the signers are Justice with reference to the identified interrelationship information signals on the basis of the identified personal information signals, said signature authority verifying unit producing a Signature authority verification result as another element of the verification result; and a verification result indicator message creating unit, connected to said signature verifying unit and said signature authority verifying unit, for creating the verification result indicator message indicative of the signature verification result and of the signature authority verification result.

15. Apparatus as claimed in claim 14, wherein said signature verifying unit verifies the digital signatures by a first signature scheme, said signing means signing by a second signature scheme different from the first signature scheme.

16. Apparatus as claimed in claim 15, wherein the first signature scheme is one of RSA and DSA digital signature schemes, the second signature scheme being another of the RSA and DSA digital signature schemes.

17. Apparatus as claimed in claim 14, wherein said signature verifying unit verifies the digital signatures with a first signature format, said signing means signing with a second signature format different from the first signature format.

18. Apparatus as claimed in claim 1, wherein said identifying means comprises a user ID and document type identifying section for identifying, as the document peculiar information, a combination of the signer's user ID code in the input document and document type information indicative of a document type of the input document to produce, as the identified document peculiar information signal, a combination of an identified user ID code indicative of the signer's user ID code and an identified document type signal indicative of the document type information.

19. Apparatus as claimed in claim 18, wherein said document related information holding means comprises:

a user verification key holding unit, connected to said user ID and document type identifying section, for preliminarily holding, as first ones of the document related information signals, user verification keys for respective user ID codes to produce, as a first element of the specified document related information signal, an identified verification key which is one of the user verification keys that corresponds to the identified user ID code;

a user personal information holding unit, connected to said user ID code and document type identifying section, for preliminarily holding, as second ones of the document related information signals, user personal information signals for the respective user ID codes to produce, as a second element of the specified document related information signal, an identified personal information signal which is one of the user personal information signals that corresponds to the identified user ID code; and a document information holding unit, connected to said user ID code and document type identifying section, for preliminarily holding, as third ones of the document related information signals, document information signals for respective document types to produce, as a third element of the specified document related information signal, an identified document information signal which is one of the document information signals that corresponds to the identified document type signal.

20. Apparatus as claimed in claim 19, wherein said verifying means comprises:

a signature verifying unit, connected to said inputting means and said user verification key holding unit, for verifying the digital signature in the input document related by using the identified verification key to produce a signature verification result as one element of the verification result;

a signature authority verifying unit, connected to said signature verifying unit, said user personal information holding unit, and said document information holding unit, for verifying the presence or absence of signature verification for a signed user on the basis of the identified personal information signal and of the identified document information signal, said signature authority verifying unit producing a signature authority verification result as another element of the verification result; and a verification result indicator message creating unit, connected to said signature verifying unit and said signature authority verifying unit, for creating the verification result indicator message indicative of the signature verification result and of the signature authority verification result.

21. Apparatus as claimed in claim 20, wherein said signature verifying unit verifies the digital signature by a first signature scheme, said signing means signing by a second signature scheme different from the first signature scheme.

22. Apparatus as claimed in claim 21, wherein the first signature scheme is one of RSA and DSA digital signature schemes, the second signature scheme being another of the RSA and DSA digital signature schemes.

23. Apparatus as claimed in claim 20, wherein said signature verifying unit verifies the digital signature with a first signature format, said signing means signing with a second signature format different from the first signature format.

24. Apparatus as claimed in claim 18, wherein a plurality of digital signatures are put on the input document by a plurality of signers, said user ID and document type identifying section producing identified user ID codes indicative of signer's user ID codes, wherein said document related information holding means comprises:

a user verification key holding unit, connected to said user ID and document type identifying section, for preliminarily holding, as first ones of the document related information signals, user verification keys for respective user ID codes to produce, as first elements of the specified document related information signal, identified verification keys which are ones of the user verification keys that correspond to the identified user ID codes;

a user personal information holding unit, connected to said user ID code and document type identifying section, for preliminarily holding, as second ones of the document related information signals, user personal information signals for the respective user ID codes to produce, as second elements of the specified document related information signal, identified personal information signals which are ones of the user personal information signals that corresponds to the identified user ID codes;

a user interrelationship information holding unit, connected to said user ID and document type identifying section, for preliminarily holding, as third ones of the document related information signals, user interrelationship information signals indicative of interrelations between users to produce, as third elements of the specified document related information signal, identified interrelationship information signals which are ones of the user interrelationship information signals that correspond to the identified user ID codes; and a document information holding unit, connected to said user ID code and document type identifying section, for preliminarily holding, as fourth ones of the document related information signals, document information signals for respective document types to produce, as a fourth element of the specified document related information signal, an identified document information signal which is one of the document information signals that corresponds to the identified document type signal.

25. Apparatus as claimed in claim 24, wherein said verifying means comprises:

a signature verifying unit, connected to said inputting means, said user ID and document type identifying section, and said user verification key holding unit, for verifying the digital signatures in the input document by using the identified verification keys to produce a signature verification result as one element of the verification result;

a signature authority verifying unit, connected to said signature verifying unit, said user personal information holding unit, said user interrelationship information holding unit, and said document information holding unit, for verifying whether or not the signers are Justice with reference to the identified interrelationship information signals on the basis of the identified personal information signals and of the identified document information signal, said signature authority verifying unit producing a signature authority verification result as another element of the verification result; and a verification result indicator message creating unit, connected to said signature verifying unit and said signature authority verifying unit, for creating the verification result indicator message indicative of the signature verification result and of the signature authority verification result.

26. Apparatus as claimed in claim 25, wherein said signature verifying unit verifies the digital signatures by a first signature scheme, said signing means signing by a second signature scheme different from the first signature scheme.

27. Apparatus as claimed in claim 26, wherein the first signature scheme is one of RSA and DSA digital signature schemes, the second signature scheme being another of the RSA and DSA digital signature schemes.

28. Apparatus as claimed in claim 25, wherein said signature verifying unit verifies the digital signatures with a first signature format, said signing means signing with a second signature format different from the first signature format.

29. Apparatus for performing signature verification for an input signature document on which at least one digital signature is put by at least one signer, the signer being assigned with a signer's user ID code, said apparatus comprising:

an inputting section for inputting the input signature document;

a user ID identifying section, connected to said inputting section, for identifying the signer's user ID code in the input document to produce an identified user ID code indicative of the signer's user ID code;

a user verification key holding unit, connected to said user ID identifying section, for preliminarily holding user verification keys for respective user ID codes to produce an identified verification key which is one of the user verification keys that corresponds to the identified user ID code;

a signature verifying unit, connected said inputting section and said user verification key holding unit, for verifying the digital signature in the input document by using the identified verification key to produce a signature verification result;

a verification result indicator message creating unit, connected to said signature verifying unit, for creating the verification result indicator message indicative of the signature verification result;

an apparatus's signature key holding section for holding an apparatus's signature key assigned to said apparatus;

a signing section, connected to the inputting section, the verification result indicator message creating unit, and said apparatus's signature key holding section, for signing at least the verification result indicator message by using the apparatus's signature key to produce a signed document; and an outputting section, connected to said signing section, for outputting the signed document as an output document.

30. Apparatus for performing signature verification for an input signature document on which at least one digital signature of at least one signer is put by a first signature scheme, the signer being assigned with a signer's user ID code, said apparatus comprising:

an inputting section for inputting the input signature document;

a user ID identifying section, connected to said inputting section, for identifying the signer's user ID code in the input document to produce an identified user ID code indicative of the signer's user ID code;

a user verification key holding unit, connected to said user ID identifying section, for preliminarily holding user verification keys for respective user ID codes to produce an identified verification key which is one of the user verification keys that corresponds to the identified user ID code;

a signature verifying unit, connected to said inputting section and said user verification key holding unit, for verifying the digital signature in the input document by using the identified verification key by the first signature scheme to produce a signature verification result;

a verification result indicator message creating unit, connected to said signature verifying unit, for creating the verification result indicator message indicative of the signature verification result;

an apparatus's signature key holding section for holding an apparatus's signature key assigned to said apparatus;

a signing section, connected to the inputting section, the verification result indicator message creating unit, and said apparatus's signature key holding section, for signing at least the verification result indicator message by using the apparatus's signature key by a second signature scheme different from the first signature scheme to produce a signed document; and an outputting section, connected to said signing section, for outputting the signed document as an output document.

31. Apparatus for performing signature verification for an input signature document on which at least one digital signature of at least one signer is put with a first signature format, the signer being assigned with a signer's user ID code, said apparatus comprising:

an inputting section for inputting the input signature document;

a user ID identifying section, connected to said inputting section, for identifying the signer's user ID code in the input document to produce an identified user ID code indicative of the signer's user ID code;

a user verification key holding unit, connected to said user ID identifying section, for preliminarily holding user verification keys for respective user ID codes to produce an identified verification key which is one of the user verification keys that corresponds to the identified user ID code;

a signature verifying unit, connected said inputting section and said user verification key holding unit, for verifying the digital signature in the input document by using the identified verification key with the first signature format to produce a signature verification result;

a verification result indicator message creating unit, connected to said signature verifying unit, for creating the verification result indicator message indicative of the signature verification result;

an apparatus's signature key holding section for holding an apparatus's signature key assigned to said apparatus;

a signing section, connected to the inputting section, the verification result indicator message creating unit, and said apparatus's signature key holding section, for signing at least the verification result indicator message by using the apparatus's signature key with a second signature format different from the first signature format to produce a signed document; and an outputting section, connected to said signing section, for outputting the signed document as an output document.

32. Apparatus for performing signature verification for an input signature document on which at least one digital signature is put by at least one signer using, the signer being assigned with a signer's user ID code, said apparatus comprising:

an inputting section for inputting the input signature document;

a user ID identifying section, connected to said inputting section, for identifying the signer's user ID code in the input document to produce an identified user ID code indicative of the signer's user ID code;

a user verification key holding unit, connected to said user ID identifying section, for preliminarily holding user verification keys for respective user ID codes to produce an identified verification key which is one of the user verification keys that corresponds to the identified user ID code;

a signature verifying unit, connected to said inputting section and said user verification key holding unit, for verifying the digital signature in the input document by using the identified verification key to produce a signature verification result;

a user personal information holding unit, connected to said user ID code identifying section, for preliminarily holding user personal information signals for the respective user ID codes to produce an identified personal information signal which is one of the user personal information signals that corresponds to the identified user ID code;

a verification result indicator message creating unit, connected to said signature verifying unit and said user personal information holding unit, for creating a verification result indicator message indicative of the signature verification result and of the identified personal information signal;

an apparatus's signature key holding section for holding an apparatus's signature key assigned to said apparatus;

a signing section, connected to the inputting section, the verification result indicator message creating unit, and said apparatus's signature key holding section, for signing at least the verification result indicator message by using the apparatus's signature key to produce a signed document; and an outputting section, connected to said signing section, for outputting the signed document as an output document.

33. Apparatus for performing signature verification for an input signature document on which at least one digital signature of at least one signer is put by a first signature scheme, the signer being assigned with a signer's user ID code, said apparatus comprising:

an inputting section for inputting the input signature document;

a user ID identifying section, connected to said inputting section, for identifying the signer's user ID code in the input document to produce an identified user ID code indicative of the signer's user ID code;

a user verification key holding unit, connected to said user ID identifying section, for preliminarily holding user verification keys for respective user ID codes to produce an identified verification key which is one of the user verification keys that corresponds to the identified user ID code;

a signature verifying unit, connected to said inputting section and said user verification key holding unit, for verifying the digital signature in the input document by using the identified verification key by the first signature scheme to produce a signature verification result;

a user personal information holding unit, connected to said user ID code identifying section, for preliminarily holding user personal information signals for the respective user ID codes to produce an identified personal information signal which is one of the user personal information signals that corresponds to the identified user ID code;

a verification result indicator message creating unit, connected to said signature verifying unit and said user personal information holding unit, for creating the verification result indicator message indicative of the signature verification result and of the identified personal information signal;

an apparatus's signature key holding section for holding an apparatus's signature key assigned to said apparatus;

a signing section, connected to the inputting section, the verification result indicator message creating unit, and said apparatus's signature key holding section, for signing at least the verification result indicator message by using the apparatus's signature key by a second signature scheme different from the first signature scheme to produce a signed document; and an outputting section, connected to said signing section, for outputting the signed document as an output document.

34. Apparatus for performing signature verification for an input signature document on which at least one digital signature of at least one signer is put with a first signature format, the signer being assigned with a signer's user ID code, said apparatus comprising:

an inputting section for inputting the input signature document;

a user ID identifying section, connected to said inputting section, for identifying the signer's user ID code in the input document to produce an identified user ID code indicative of the signer's user ID code;

a user verification key holding unit, connected to said user ID identifying section, for preliminarily holding user verification keys for respective user ID codes to produce an identified verification key which is one of the user verification keys that corresponds to the identified user ID code;

a signature verifying unit, connected to said inputting section and said user verification key holding unit, for verifying the digital signature in the input document by using the identified verification key with the first signature format to produce a signature verification result;

a user personal information holding unit, connected to said user ID code identifying section, for preliminarily holding user personal information signals for the respective user ID codes to produce an identified personal information signal which is one of the user personal information signals that corresponds to the identified user ID code;

a verification result indicator message creating unit, connected to said signature verifying unit and said user personal information holding unit, for creating a verification result indicator message indicative of the signature verification result and of the identified personal information signal;

an apparatus's signature key holding section for holding an apparatus's signature key assigned to said apparatus;

a signing section, connected to the inputting section, the verification result indicator message creating unit, and said apparatus's signature key holding section, for signing at least the verification result indicator message by using the apparatus's signature key with a second signature format different from the first signature format to produce a signed document; and an outputting section, connected to said signing section, for outputting the signed document as an output document.

35. Apparatus for performing signature verification for an input signature document on which a plurality of digital signatures are put by a plurality of signers, the signers being assigned with signer's user ID codes, respectively, said apparatus comprising:

an inputting section for inputting the input signature document;

a user ID identifying section, connected to said inputting section, for identifying the signer's user ID codes in the input document to produce identified user ID codes indicative of the signer's user ID codes;

a user verification key holding unit, connected to said user ID identifying section, for preliminarily holding user verification keys for respective user ID codes to produce identified verification keys which are ones of the user verification keys that correspond to the identified user ID codes;

a signature verifying unit, connected to said inputting section, said user ID identifying section, and said user verification key holding unit, for verifying the digital signatures in the input document by using the identified verification keys to produce a signature verification result;

a user personal information holding unit, connected to said user ID code identifying section, for preliminarily holding user personal information signals for the respective user ID codes to produce identified personal information signals which are ones of the user personal information signals that correspond to the identified user ID codes;

a user interrelationship information holding unit, connected to said user ID identifying section, for preliminarily holding user interrelationship information signals indicative of interrelations between users to produce identified interrelationship information signals which are ones of the user interrelationship information signals that correspond to the identified user ID codes;

a signature authority verifying unit, connected to said signature verifying unit, said user personal information holding unit, and said user interrelationship information holding unit, for verifying whether or not the signers are justice with reference to the identified interrelationship information signals on the basis of the identified personal information signals, said signature authority verifying unit producing a signature authority verification result;

a verification result indicator message creating unit, connected to said signature verifying unit and said signature authority verifying unit, for creating a verification result indicator message indicative of the signature verification result and of the signature authority verification result;

an apparatus's signature key holding section for holding an apparatus's signature key assigned to said apparatus;

a signing section, connected to the inputting section, the verification result indicator message creating unit, and said apparatus's signature key holding section, for signing at least the verification result indicator message by using the apparatus's signature key to produce a signed document; and an outputting section, connected to said signing section, for outputting the signed document as an output document.

36. Apparatus for performing signature verification for an input signature document on which a plurality of digital signatures of a plurality of signers are put by a first signature scheme, the signers being assigned with signer's user ID codes, respectively, said apparatus comprising:

an inputting section for inputting the input signature document;

a user ID identifying section, connected to said inputting section, for identifying the signer's user ID codes in the input document to produce identified user ID codes indicative of the signer's user ID codes;

a user verification key holding unit, connected to said user ID identifying section, for preliminarily holding user verification keys for respective user ID codes to produce identified verification keys which are ones of the user verification keys that correspond to the identified user ID codes;

a signature verifying unit, connected to said inputting section, said user ID identifying section, and said user verification key holding unit, for verifying the digital signatures in the input document by using the identified verification keys by the first signature scheme to produce a signature verification result;

a user personal information holding unit, connected to said user ID code identifying section, for preliminarily holding user personal information signals for the respective user ID codes to produce identified personal information signals which are ones of the user personal information signals that correspond to the identified user ID codes;

a user interrelationship information holding unit, connected to said user ID identifying section, for preliminarily holding user interrelationship information signals indicative of interrelations between users to produce identified interrelationship information signals which are ones of the interrelationship information signals that correspond to the identified user ID codes;

a signature authority verifying unit, connected to said signature verifying unit, said user personal information holding unit, and said user interrelationship information holding unit, for verifying whether or not the signers are justice with reference to the identified interrelationship information signals on the basis of the identified personal information signals, said signature authority verifying unit producing a signature authority verification result;

a verification result indicator message creating unit, connected to said signature verifying unit and said signature authority verifying unit, for creating a verification result indicator message indicative of the signature verification result and of the signature authority verification result;

an apparatus's signature key holding section for holding an apparatus's signature key assigned to said apparatus;

a signing section, connected to the inputting section, the verification result indicator message creating unit, and said apparatus's signature key holding section, for signing at least the verification result indicator message by using the apparatus's signature key by a second signature scheme different from the first signature scheme to produce a signed document; and an outputting section, connected to said signing section, for outputting the signed document as an output document.

37. Apparatus for performing signature verification for an input signature document on which a plurality of digital signatures of a plurality of signers are put with a first signature format, the signers being assigned with signer's user ID codes, respectively, said apparatus comprising:

an inputting section for inputting the input signature document;

a user ID identifying section, connected to said inputting section, for identifying the signer's user ID codes in the input document to produce identified user ID codes indicative of the signer's user ID codes;

a user verification key holding unit, connected to said user ID identifying section, for preliminarily holding user verification keys for respective user ID codes to produce identified verification keys which are ones of the user verification keys that correspond to the identified user ID codes;

a signature verifying unit, connected to said inputting section, said user ID identifying section, and said user verification key holding unit, for verifying the digital signatures in the input document by using the identified verification keys with the first signature format to produce a signature verification result;

a user personal information holding unit, connected to said user ID code identifying section, for preliminarily holding user personal information signals for the respective user ID codes to produce identified personal information signals which are ones of the user personal information signals that correspond to the identified user ID codes;

a user interrelationship information holding unit, connected to said user ID identifying section, for preliminarily holding user interrelationship information signals indicative of interrelations between users to produce identified interrelationship information signals which are ones of the interrelationship information signals that correspond to the identified user ID codes;

a signature authority verifying unit, connected to said signature verifying unit, said user personal information holding unit, and said user interrelationship information holding unit, for verifying whether or not the signers are justice with reference to the identified interrelationship information signals on the basis of the identified personal information signals, said signature authority verifying unit producing a signature authority verification result;

a verification result indicator message creating unit, connected to said signature verifying unit and said signature authority verifying unit, for creating a verification result indicator message indicative of the signature verification result and of the signature authority verification result;

an apparatus's signature key holding section for holding an apparatus's signature key assigned to said apparatus;

a signing section, connected to the inputting section, the verification result indicator message creating unit, and said apparatus's signature key holding section, for signing at least the verification result indicator message by using the apparatus's signature key with a second signature format different from the first signature format to produce a signed document; and an outputting section, connected to said signing section, for outputting the signed document as an output document.

38. Apparatus for performing signature verification for an input signature document on which at least one digital signature is put by at least one signer, the signer being assigned with a signer's user ID code, said apparatus comprising:

an inputting section for inputting the input signature document;

a user ID and document type identifying section, connected to said inputting section, for identifying the signer's user ID code in the input document and document type information indicative of a document type of the input document to produce an identified user ID code indicative of the signer's user ID code and an identified document type signal indicative of the document type information;

a user verification key holding unit, connected to said user ID and document type identifying section, for preliminarily holding user verification keys for respective user ID codes to produce an identified verification key which is one of the user verification keys that corresponds to the identified user ID code;

a signature verifying unit, connected to said inputting section and said user verification key holding unit, for verifying the digital signature in the input document by using the identified verification key to produce a signature verification result;

a user personal information holding unit, connected to said user ID and document type identifying section, for preliminarily holding user personal information signals for the respective user ID codes to produce an identified personal information signal which is one of the user personal information signals that corresponds to the identified user ID code;

a document information holding unit, connected to said user ID and document type identifying section, for preliminarily holding document information signals for respective document types to produce an identified document information signal which is one of the document information signals that corresponds to the identified document type signal;

a signature authority verifying unit, connected to said signature verifying unit, said user personal information holding unit, and said document information holding unit, for verifying the presence or absence of signature verification for a signed user on the basis of the identified personal information signal and of the identified document information signal, said signature authority verifying unit producing a signature authority verification result;

a verification result indicator message creating unit connected to said signature verifying unit and said signature authority verifying unit, for creating a verification result indicator message indicative of the signature verification result and of the signature authority verification result;

an apparatus's signature key holding section for holding an apparatus's signature key assigned to said apparatus;

a signing section, connected to the inputting section, the verification result indicator message creating unit, and said apparatus's signature key holding section, for signing at least the verification result indicator message by using the apparatus's signature key to produce a signed document; and an outputting section, connected to said signing section, for outputting the signed document as an output document.

39. Apparatus for performing signature verification for an input signature document on which at least one digital signature of at least one signer is put by a first signature scheme, the signer being assigned with a signer's user ID code, said apparatus comprising:

an inputting section for inputting the input signature document;

a user ID and document type identifying section, connected to said inputting section, for identifying the signer's user ID code in the input document and document type information indicative of a document type of the input document to produce an identified user ID code indicative of the signer's user ID code and an identified document type signal indicative of the document type information;

a user verification key holding unit, connected to said user ID and document type identifying section, for preliminarily holding user verification keys for respective user ID codes to produce an identified verification key which is one of the user verification keys that corresponds to the identified user ID code;

a signature verifying unit, connected to said inputting section and said user verification key holding unit, for verifying the digital signature in the input document by using the identified verification key by the first signature scheme to produce a signature verification result;

a user personal information holding unit, connected to said user ID code and document type identifying section, for preliminarily holding user personal information signals for the respective user ID codes to produce an identified personal information signal which is one of the user personal information signals that corresponds to the identified user ID code;

a document information holding unit, connected to said user ID code and document type identifying section, for preliminarily holding document information signals for respective document types to produce an identified document information signal which is one of the document information signals that corresponds to the identified document type signal;

a signature authority verifying unit, connected to said signature verifying unit, said user personal information holding unit, and said document information holding unit, for verifying the presence or absence of signature verification for a signed user on the basis of the identified personal information signal and of the identified document information signal, said signature authority verifying unit producing a signature authority verification result;

a verification result indicator message creating unit, connected to said signature verifying unit and said signature authority verifying unit, for creating a verification result indicator message indicative of the signature verification result and of the signature authority verification result;

an apparatus's signature key holding section for holding an apparatus's signature key assigned to said apparatus;

a signing section, connected to the inputting section, the verification result indicator message creating unit, and said apparatus's signature key holding section, for signing at least the verification result indicator message by using the apparatus's signature key by a second signature scheme different from the first signature scheme to produce a signed document; and an outputting section, connected to said signing section, for outputting the signed document as an output document.

40. Apparatus for performing signature verification for an input signature document on which at least one digital signature of at least one signer is put with a first signature format, the signer being assigned with a signer's user ID code, said apparatus comprising:

an inputting section for inputting the input signature document;

a user ID and document type identifying section, connected to said inputting section, for identifying the signer's user ID code in the input document and document type information indicative of a document type of the input document to produce an identified user ID code indicative of the signer's user ID code and an identified document type signal indicative of the document type information;

a user verification key holding unit, connected to said user ID and document type identifying section, for preliminarily holding user verification keys for respective user ID codes to produce an identified verification key which is one of the user verification keys that corresponds to the identified user ID code;

a signature verifying unit, connected to said inputting section and said user verification key holding unit, for verifying the digital signature in the input document by using the identified verification key with the first signature format to produce a signature verification result;

a user personal information holding unit, connected to said user ID code and document type identifying section, for preliminarily holding user personal information signals for the respective user ID codes to produce an identified personal information signal which is one of the user personal information signals that corresponds to the identified user ID code;

a document information holding unit, connected to said user ID code and document type identifying section, for preliminarily holding document information signals for respective document types to produce an identified document information signal which is one of the document information signals that corresponds to the identified document type signal;

a signature authority verifying unit, connected to said signature verifying unit, said user personal information holding unit, and said document information holding unit, for verifying the presence or absence of signature verification for a signed user on the basis of the identified personal information signal and of the identified document information signal, said signature authority verifying unit producing a signature authority verification result;

a verification result indicator message creating unit, connected to said signature verifying unit and said signature authority verifying unit, for creating a verification result indicator message indicative of the signature verification result and of the signature authority verification result;

an apparatus's signature key holding section for holding an apparatus's signature key assigned to said apparatus;

a signing section, connected to the inputting section, the verification result indicator message creating unit, and said apparatus's signature key holding section, for signing at least the verification result indicator message by using the apparatus's signature key with a second signature format different from the first signature format to produce a signed document; and an outputting section, connected to said signing section, for outputting the signed document as an output document.

41. Apparatus for performing signature verification for an input signature document on which a plurality of digital signatures are put by a plurality of signers, the signers being assigned with signer's user ID codes, respectively, said apparatus comprising:

an inputting section for inputting the input signature document;

a user ID and document type identifying section, connected to said inputting section, for identifying the signer's user ID codes in the input document and document type information indicative of a document type of the input document to produce identified user ID codes indicative of the signer's user ID codes and an identified document type signal indicative of the document type information;

a user verification key holding unit, connected to said user ID and document type identifying section, for preliminarily holding user verification keys for respective user ID codes to produce identified verification keys which are ones of the user verification keys that correspond to the identified user ID codes;

a signature verifying unit, connected to said inputting section, said user ID and document type identifying section, and said user verification key holding unit, for verifying the digital signatures in the input document by using the identified verification keys to produce a signature verification result;

a user personal information holding unit, connected to said user ID code and document type identifying section, for preliminarily holding user personal information signals for the respective user ID codes to produce identified personal information signals which are ones of the user personal information signals that correspond to the identified user ID codes;

a user interrelationship information holding unit, connected to said user ID and document type identifying section, for preliminarily holding user interrelationship information signals indicative of interrelations between users to produce identified interrelationship information signals which are ones of the interrelationship information signals that correspond to the identified user ID codes;

a document information holding unit, connected to said user ID and document type identifying section, for preliminarily holding document information signals for respective document types to produce an identified document information signal which is one of the document information signals that corresponds to the identified document type signal;

a signature authority verifying unit, connected to said signature verifying unit, said user personal information holding unit, said user interrelationship information holding unit, and said document information holding unit, for verifying whether or not the signers are justice with reference to the identified interrelationship information signals on the basis of the identified personal information signals and of the identified document information signal, said signature authority verifying unit producing a signature authority verification result;

a verification result indicator message creating unit, connected to said signature verifying unit and said signature authority verifying unit, for creating a verification result indicator message indicative of the signature verification result and of the signature authority verification result;

an apparatus's signature key holding section for holding an apparatus's signature key assigned to said apparatus;

a signing section, connected to the inputting section, the verification result indicator message creating unit, and said apparatus's signature key holding section, for signing at least the verification result indicator message by using the apparatus's signature key to produce a signed document; and an outputting section, connected to said signing section, for outputting the signed document as an output document.

42. Apparatus for performing signature verification for an input signature document on which a plurality of digital signatures of a plurality of signers are put by a first signature scheme, the signers being assigned with signer's user ID codes, respectively, said apparatus comprising:

an inputting section for inputting the input signature document;

a user ID and document type identifying section, connected to said inputting section, for identifying the signer's user ID codes in the input document and document type information indicative of a document type of the input document to produce identified user ID codes indicative of the signer's user ID codes and an identified document type signal indicative of the document type information;

a user verification key holding unit, connected to said user ID and document type identifying section, for preliminarily holding user verification keys for respective user ID codes to produce identified verification keys which are ones of the user verification keys that correspond to the identified user ID codes;

a signature verifying unit, connected said inputting section, said user ID and document type identifying section, and said user verification key holding unit, for verifying the digital signatures in the input document by using the identified verification keys by the first signature scheme to produce a signature verification result;

a user personal information holding unit, connected to said user ID code and document type identifying section, for preliminarily holding user personal information signals for the respective user ID codes to produce identified personal information signals which are ones of the user personal information signals that correspond to the identified user ID codes;

a user interrelationship information holding unit, connected to said user ID and document type identifying section, for preliminarily holding user interrelationship information signals indicative of interrelations between users to produce identified interrelationship information signals which are ones of the interrelationship information signals that corresponds to the identified user ID codes;

a document information holding unit, connected to said user ID and document type identifying section, for preliminarily holding document information signals for respective document types to produce an identified document information signal which is one of the document information signals that corresponds to the identified document type signal;

a signature authority verifying unit, connected to said signature verifying unit, said user personal information holding unit, said user interrelationship information holding unit, and said document information holding unit, for verifying whether or not the signers are justice with reference to the identified interrelationship information signals on the basis of the identified personal information signals and of the identified document information signal, said signature authority verifying unit producing a signature authority verification result;

a verification result indicator message creating unit, connected to said signature verifying unit and said signature authority verifying unit, for creating a verification result indicator message indicative of the signature verification result and of the signature authority verification result;

an apparatus's signature key holding section for holding an apparatus's signature key assigned to said apparatus;

a signing section, connected to the inputting section, the verification result indicator message creating unit, and said apparatus's signature key holding section, for signing at least the verification result indicator message by using the apparatus's signature key by a second signature scheme different from the first signature scheme to produce a signed document; and an outputting section, connected to said signing section, for outputting the signed document as an output document.

43. Apparatus for performing signature verification for an input signature document on which a plurality of digital signatures of a plurality of signers are put with a first signature format, the signer being assigned with a signer's user ID code, said apparatus comprising:

an inputting section for inputting the input signature document;

a user ID and document type identifying section, connected to said inputting section, for identifying the signer's user ID codes in the input document and document type information indicative of a document type of the input document to produce identified user ID codes indicative of the signer's user ID codes and an identified document type signal indicative of the document type information;

a user verification key holding unit, connected to said user ID and document type identifying section, for preliminarily holding user verification keys for respective user ID codes to produce identified verification keys which are ones of the user verification keys that correspond to the identified user ID codes;

a signature verifying unit, connected said inputting section, said user ID and document type identifying section, and said user verification key holding unit, for verifying the digital signatures in the input document by using the identified verification keys with the first signature format to produce a signature verification result;

a user personal information holding unit, connected to said user ID code and document type identifying section, for preliminarily holding user personal information signals for the respective user ID codes to produce identified personal information signals which are ones of the user personal information signals that correspond to the identified user ID codes;

a user interrelationship information holding unit, connected to said user ID and document type identifying section, for preliminarily holding user interrelationship information signals indicative of interrelations between users to produce identified interrelationship information signals which are ones of the interrelationship information signals that corresponds to the identified user ID codes;

a document information holding unit, connected to said user ID and document type identifying section, for preliminarily holding document information signals for respective document types to produce an identified document information signal which is one of the document information signals that corresponds to the identified document type signal;

a signature authority verifying unit, connected to said signature verifying unit, said user personal information holding unit, said user interrelationship information holding unit, and said document information holding unit, for verifying whether or not the signers are justice with reference to the identified interrelationship information signals on the basis of the identified personal information signals and of the identified document information signal, said signature authority verifying unit producing a signature authority verification result;

a verification result indicator message creating unit, connected to said signature verifying unit and said signature authority verifying unit, for creating a verification result indicator message indicative of the signature verification result and of the signature authority verification result;

an apparatus's signature key holding section for holding an apparatus's signature key assigned to said apparatus;

a signing section, connected to the inputting section, the verification result indicator message creating unit, and said apparatus's signature key holding section, for signing at least the verification result indicator message by using the apparatus's signature key with a second signature format different from the first signature format to produce a signed document; and an outputting section, connected to said signing section, for outputting the signed document as an output document.

44. A method of performing signature verification for an input document on which at least one digital signature is put by at least one signer, said method comprising the steps of:
(a) inputting the input document;
(b) identifying document peculiar information included in the input document to produce an identified document peculiar information signal;
(c) accessing a document related information holding section for preliminarily holding a plurality of document related information signals to make the document related information holding section produce, as a specified document related information signal, one of the document related information signals that corresponds to the identified document peculiar information signal;
(d) verifying the digital signature in the input document by using the specified document related information signal to produce a verification result indicator message indicative of a verification result;
(e) signing at least the verification result indicator message by using an apparatus's signature key held in an apparatus's signature key holding section to produce a signed document; and
(f) outputting the signed document as an output document.

45. A method as claimed in claim 44, wherein said step (d) verifies the digital signature by a first signature scheme, said step (e) signs by a second signature scheme different from the first signature scheme.

46. A method as claimed in claim 44, wherein said step (d) verifies the digital signature with a first signature format, said step (e) signs with a second signature format different from the first signature format.

47. A method of performing signature verification for an input document on which at least one digital signature is put by at least one signer, the signer being assigned with a signer's user ID code, said method comprising the steps of:
(a) inputting the input document;
(b) identifying the signer's user ID code in the input document to produce an identified user ID code;
(c) accessing a user verification key holding unit for preliminarily holding a plurality of user verification keys for respective user ID codes to make said user verification key holding unit produce, as an identified verification key, one of the user verification keys that corresponds to the identified user ID code;
(d) verifying the digital signature signed in the input document by using the identified verification key to produce a signature verification result;
(e) creating a verification result indicator message indicative of the signature verification result;
(f) signing at least the verification result indicator message by using an apparatus's signature key held in an apparatus's signature key holding section to produce a signed document; and
(g) outputting the signed document as an output document.

48. A method of performing signature verification for an input document on which at least one digital signature of at least one signer is put by a first signature scheme, the signer being assigned with a signer's user ID code, said method comprising the steps of:
(a) inputting the input document;
(b) identifying the signer's user ID code in the input document to produce an identified user ID code;
(c) accessing a user verification key holding unit for preliminarily holding a plurality of user verification keys for respective user ID codes to make said user verification key holding unit produce, as an identified verification key, one of the user verification keys that corresponds to the identified user ID code;
(d) verifying the digital signature signed in the input document by using the identified verification key by the first signature scheme to produce a signature verification result;
(e) creating a verification result indicator message indicative of the signature verification result;
(f) signing, by a second signature scheme different from the first signature scheme, at least the verification result indicator message by using an apparatus's signature key held in an apparatus's signature key holding section to produce a signed document; and
(g) outputting the signed document as an output document.

49. A method of performing signature verification for an input document on which at least one digital signature of at least one signer is put with a first signature format, the signer being assigned with a signer's user ID code, said method comprising the steps of:
(a) inputting the input document;
(b) identifying the signer's user ID code in the input document to produce an identified user ID code;
(c) accessing a user verification key holding unit for preliminarily holding a plurality of user verification keys for respective user ID codes to make said user verification key holding unit produce, as an identified verification key, one of the user verification keys that corresponds to the identified user ID code;
(d) verifying the digital signature signed in the input document by using the identified verification key with the first signature format to produce a signature verification result;
(e) creating a verification result indicator message indicative of the signature verification result;
(f) signing, with a second signature format different from the first signature format, at least the verification result indicator message by using an apparatus's signature key held in an apparatus's signature key holding section to produce a signed document; and
(g) outputting the signed document as an output document.

50. A method of performing signature verification for an input document on which at least one digital signature is put by at least one signer, the signer being assigned with a signer's user ID code, said method comprising the steps of:
(a) inputting the input document;
(b) identifying the signer's user ID code in the input document to produce an identified user ID code;
(c) accessing a user verification key holding unit for preliminarily holding a plurality of user verification keys for respective user ID codes to make said user verification key holding unit produce, as an identified verification key, one of the user verification keys that corresponds to the identified user ID code;

(d) verifying the digital signature signed in the input document by using the identified verification key to produce a signature verification result;

(e) accessing a user personal information holding unit for preliminarily holding a plurality of user personal information signals for the respective user ID codes to make said user personal information holding unit produce, as an identified personal information signal, one of the user personal information signals that corresponds to the identified user ID code;

(f) creating a verification result indicator message indicative of the signature verification result and of the identified personal information signal;

(g) signing at least the verification result indicator message by using an apparatus's signature key held in an apparatus's signature key holding section to produce a signed document; and (g) outputting the signed document as an output document.

51. A method of performing signature verification for an input document on which at least one digital signature of at least one signer is put by a first signature scheme, the signer being assigned with a signer's user ID code, said method comprising the steps of:

(a) inputting the input document;

(b) identifying the signer's user ID code in the input document to produce an identified user ID code;

(c) accessing a user verification key holding section for preliminarily holding a plurality of user verification keys for respective user ID codes to make said user verification key holding unit produce, as an identified verification key, one of the user verification keys that corresponds to the identified user ID code;

(d) verifying the digital signature signed in the input document by using the identified verification key by the first signature scheme to produce a signature verification result;

(e) accessing a user personal information holding unit for preliminarily holding a plurality of user personal information signals for the respective user ID codes to make said user personal information holding unit produce, as an identified personal information signal, one of the user personal information signals that corresponds to the identified user ID code;

(f) creating a verification result indicator message indicative of the signature verification result and of the identified personal information signal;

(g) signing, by a second signature scheme different from the first signature scheme, at least the verification result indicator message by using an apparatus's signature key held in an apparatus's signature key holding section to produce a signed document; and (h) outputting the signed document as an output document.

52. A method of performing signature verification for an input document on which at least one digital signature of at least one signer is put with a first signature format, the signer being assigned with a signer's user ID code, said method comprising the steps of:

(a) inputting the input document;

(b) identifying the signer's user ID code in the input document to produce an identified user ID code;

(c) accessing a user verification key holding section for preliminarily holding a plurality of user verification keys for respective user ID codes to make said user verification key holding unit produce, as an identified verification key, one of the user verification keys that corresponds to the identified user ID code;

(d) verifying the digital signature signed in the input document by using the identified verification key with the first signature format to produce a signature verification result;

(e) accessing a user personal information holding unit for preliminarily holding a plurality of user personal information signals for the respective user ID codes to make said user personal information holding unit produce, as an identified personal information signal, one of the user personal information signals that corresponds to the identified user ID code;

(f) creating a verification result indicator message indicative of the signature verification result and of the identified personal information signal;

(g) signing, with a second signature format different from the first signature format, at least the verification result indicator message by using an apparatus's signature key held in an apparatus's signature key holding section to produce a signed document; and (h) outputting the signed document as an output document.

53. A method of performing signature verification for an input document on which a plurality of digital signatures are put by a plurality of signers, the signers being assigned with signer's user ID codes, respectively, said method comprising the steps of:

(a) inputting the input document;

(b) identifying the signer's user ID codes in the input document to produce identified user ID codes;

(c) accessing a user verification key holding unit for preliminarily holding a plurality of user verification keys for respective user ID codes to make said user verification key holding unit produce, as identified verification keys, ones of the user verification keys that correspond to the identified user ID codes;

(d) verifying the digital signatures signed in the input document by using the identified verification keys to produce a signature verification result;

(e) accessing a user personal information holding unit for preliminarily holding a plurality of user personal information signals for the respective user ID codes to make said user personal information holding unit produce, as identified personal information signals, ones of the user personal information signals that correspond to the identified user ID codes;

(f) accessing a user interrelationship information holding unit for preliminarily holding a plurality of user interrelationship information signals indicative of interrelations between users to make said user interrelationship information holding unit produce, as identified interrelationship information signals, ones of the user interrelationship information signals that correspond to the identified user ID codes;

(g) verifying whether or not the signers are justice with reference to the identified interrelationship information signals on the basis of the identified personal information signals to produce a signature authority verification result;

(h) creating a verification result indicator message indicative of the signature verification result and of the signature authority verification result;

(i) signing at least the verification result indicator message by using an apparatus's signature key held in an apparatus's signature key holding section to produce a signed document; and (j) outputting the signed document as an output document.

54. A method of performing signature verification for an input document on which a plurality of digital signatures of a plurality of signers are put by a first signature scheme, the signers being assigned with signer's user ID codes, respectively, said method comprising the steps of:

(a) inputting the input document;

(b) identifying the signer's user ID codes in the input document to produce identified user ID codes;

(c) accessing a user verification key holding section for preliminarily holding a plurality of user verification keys for respective user ID codes to make said user verification key holding unit produce, as identified verification keys, ones of the user verification keys that correspond to the identified user ID codes;

(d) verifying the digital signatures signed in the input document by using the identified verification keys by the first signature scheme to produce a signature verification result;

(e) accessing a user personal information holding unit for preliminarily holding a plurality of user personal information signals for the respective user ID codes to make said user personal information holding unit produce, as identified personal information signals, ones of the user personal information signals that correspond to the identified user ID codes;

(f) accessing a user interrelationship information holding unit for preliminarily holding a plurality of user interrelationship information signals indicative of interrelations between users to make said user interrelationship information holding unit produce, as identified interrelationship information signals, ones of the user interrelationship information signals that correspond to the identified user ID codes;

(g) verifying whether or not the signers are justice with reference to the identified interrelationship information signals on the basis of the identified personal information signals to produce a signature authority verification result;

(h) creating a verification result indicator message indicative of the signature verification result and of the signature authority verification result;

(i) signing, by a second signature scheme different from the first signature scheme, at least the verification result indicator message by using an apparatus's signature key held in an apparatus's signature key holding section to produce a signed document; and (j) outputting the signed document as an output document.

55. A method of performing signature verification for an input document on which a plurality of digital signatures of a plurality of signers are put with a first signature format, the signers being assigned with signer's user ID codes, respectively, said method comprising the steps of:

(a) inputting the input document;

(b) identifying the signer's user ID codes in the input document to produce identified user ID codes;

(c) accessing a user verification key holding section for preliminarily holding a plurality of user verification keys for respective user ID codes to make said user verification key holding unit produce, as identified verification keys, ones of the user verification keys that correspond to the identified user ID codes;

(d) verifying the digital signatures signed in the input document by using the identified verification keys with the first signature format to produce a signature verification result;

(e) accessing a user personal information holding unit for preliminarily holding a plurality of user personal information signals for the respective user ID codes to make said user personal information holding unit produce, as identified personal information signals, ones of the user personal information signals that correspond to the identified user ID codes;

(f) accessing a user interrelationship information holding unit for preliminarily holding a plurality of user interrelationship information signals indicative of interrelations between users to make said user interrelationship information holding unit produce, as identified interrelationship information signals, ones of the user interrelationship information signals that correspond to the identified user ID codes;

(g) verifying whether or not the signers are justice with reference to the identified interrelationship information signals on the basis of the identified personal information signals to produce a signature authority verification result;

(h) creating a verification result indicator message indicative of the signature verification result and of the signature authority verification result;

(i) signing, with a second signature format different from the first signature format, at least the verification result indicator message by using an apparatus's signature key held in an apparatus's signature key holding section to produce a signed document; and (j) outputting the signed document as an output document.

56. A method of performing signature verification for an input document on which at least one digital signature is put by at least one signer, the signer being assigned with a signer's user ID code, said method comprising the steps of:

(a) inputting the input document;

(b) identifying the signer's user ID code in the input document and document type information indicative of a document type of the input document to produce an identified user ID code and an identified document type signal;

(c) accessing a user verification key holding unit for preliminarily holding a plurality of user verification keys for respective user ID codes to make said user verification key holding unit produce, as an identified verification key, one of the user verification keys that corresponds to the identified user ID code;

(d) verifying the digital signature signed in the input document by using the identified verification key to produce a signature verification result;

(e) accessing a user personal information holding unit for preliminarily holding a plurality of user personal information signals for the respective user ID codes to make said user personal information holding unit produce, as an identified personal information signal, one of the user personal information signals that corresponds to the identified user ID code;

(f) accessing a document information holding unit for preliminarily holding a plurality of document information signals for respective document types to make said document information holding unit produce, as an identified document information signal, one of the document information signals that corresponds to the identified document type signal;

(g) verifying the presence or absence of signature verification for a signed user on the basis of the identified personal information signal and of the identified document information signal to produce a signature authority verification result;

(h) creating a verification result indicator message indicative of the signature verification result and of the signature authority verification result;

(i) signing at least the verification result indicator message by using an apparatus's signature key held in an apparatus's signature key holding section to produce a signed document; and (j) outputting the signed document as an output document.

57. A method of performing signature verification for an input document on which at least one digital signature of at least one signer is put by a first signature scheme, the signer being assigned with a signer's user ID code, said method comprising the steps of:

(a) inputting the input document;

(b) identifying the signer's user ID code in the input document and document type information indicative of a document type of the input document to produce an identified user ID code and an identified document type signal;

(c) accessing a user verification key holding section for preliminarily holding a plurality of user verification keys for respective user ID codes to make said user verification key holding unit produce, as an identified verification key, one of the user verification keys that corresponds to the identified user ID code;

(d) verifying the digital signature signed in the input document by using the identified verification key by the first signature scheme to produce a signature verification result;

(e) accessing a user personal information holding unit for preliminarily holding a plurality of user personal information signals for the respective user ID codes to make said user personal information holding unit produce, as an identified personal information signal, one of the user personal information signals that corresponds to the identified user ID code;

(f) accessing a document information holding unit for preliminarily holding a plurality of document information signals for respective document types to make said document information holding unit produce, as an identified document information signal, one of the document information signals that corresponds to the identified document type signal;

(g) verifying the presence or absence of signature verification for a signed user on the basis of the identified personal information signal and of the identified document information signal to produce a signature authority verification result;

(h) creating a verification result indicator message indicative of the signature verification result and of the signature authority verification result;

(i) signing, by a second signature scheme different from the first signature scheme, at least the verification result indicator message by using an apparatus's signature key held in an apparatus's signature key holding section to produce a signed document; and (j) outputting the signed document as an output document.

58. A method of performing signature verification for an input document on which at least one digital signature of at least one signer is put with a first signature format, the signer being assigned with a signer's user ID code, said method comprising the steps of:

(a) inputting the input document;

(b) identifying the signer's user ID code in the input document and document type information indicative of a document type of the input document to produce an identified user ID code and an identified document type signal;

(c) accessing a user verification key holding section for preliminarily holding a plurality of user verification keys for respective user ID codes to make said user verification key holding unit produce, as an identified verification key, one of the user verification keys that corresponds to the identified user ID code;

(d) verifying the digital signature signed in the input document by using the identified verification key with the first signature format to produce a signature verification result;

(e) accessing a user personal information holding unit for preliminarily holding a plurality of user personal information signals for the respective user ID codes to make said user personal information holding unit produce, as an identified personal information signal, one of the user personal information signals that corresponds to the identified user ID code;

(f) accessing a document information holding unit for preliminarily holding a plurality of document information signals for respective document types to make said document information holding unit produce, as an identified document information signal, one of the document information signals that corresponds to the identified document type signal;

(g) verifying the presence or absence of signature verification for a signed user on the basis of the identified personal information signal and of the identified document information signal to produce a signature authority verification result;

(h) creating a verification result indicator message indicative of the signature verification result and of the signature authority verification result;

(i) signing, with a second signature format different from the first signature format, at least the verification result indicator message by using an apparatus's signature key held in an apparatus's signature key holding section to produce a signed document; and (j) outputting the signed document as an output document.

59. A method of performing signature verification for an input document on which a plurality of digital signatures are put by a plurality of signers, the signers being assigned with signer's user ID codes, respectively, said method comprising the steps of:

(a) inputting the input document;

(b) identifying the signer's user ID codes in the input document and document type information indicative of a document type of the input document to produce identified user ID codes and an identified document type signal;

(c) accessing a user verification key holding unit for preliminarily holding a plurality of user verification keys for respective user ID codes to make said user verification key holding unit produce, as identified verification keys, ones of the user verification keys that correspond to the identified user ID codes;

(d) verifying the digital signatures signed in the input document by using the identified verification keys to produce a signature verification result;

(e) accessing a user personal information holding unit for preliminarily holding a plurality of user personal information signals for the respective user ID codes to make said user personal information holding unit produce, as identified personal information signals, ones of the user personal information signals that correspond to the identified user ID codes;

(f) accessing a user interrelationship information holding unit for preliminarily holding a plurality of user interrelationship information signals indicative of interrelations between users to make said user interrelationship information holding unit produce, as identified interrelationship information signals, ones of the user interrelationship information signals that correspond to the identified user ID codes;

(g) accessing a document information holding unit for preliminarily holding a plurality of document information signals for respective document types to make said document information holding unit produce, as an identified document information signal, one of the document information signals that corresponds to the identified document type signal;

(h) verifying whether or not the signers are justice with reference to the identified interrelationship information signals on the basis of the identified personal information signals and of the identified document information signal to produce a signature authority verification result;

(i) creating a verification result indicator message indicative of the signature verification result and of the signature authority verification result;

(j) signing at least the verification result indicator message by using an apparatus's signature key held in an apparatus's signature key holding section to produce a signed document; and (k) outputting the signed document as an output document.

60. A method of performing signature verification for an input document on which a plurality of digital signatures of a plurality of signers are put by a first signature scheme, the signers being assigned with signer's user ID codes, respectively, said method comprising the steps of:

(a) inputting the input document;

(b) identifying the signer's user ID codes in the input document and document type information indicative of a document type of the input document to produce identified user ID codes and an identified document type signal;

(c) accessing a user verification key holding section for preliminarily holding a plurality of user verification keys for respective user ID codes to make said user verification key holding unit produce, as identified verification keys, ones of the user verification keys that correspond to the identified user ID codes;

(d) verifying the digital signatures signed in the input document by using the identified verification keys by the first signature scheme to produce a signature verification result;

(e) accessing a user personal information holding unit for preliminarily holding a plurality of user personal information signals for the respective user ID codes to make said user personal information holding unit produce, as identified personal information signals, ones of the user personal information signals that correspond to the identified user ID codes;

(f) accessing a user interrelationship information holding unit for preliminarily holding a plurality of user interrelationship information signals indicative of interrelations between users to make said user interrelationship information holding unit produce, as identified interrelationship information signals, ones of the user interrelationship information signals that correspond to the identified user ID codes;

(g) accessing a document information holding unit for preliminarily holding a plurality of document information signals for respective document types to make said document information holding unit produce, as an identified document information signal, one of the document information signals that corresponds to the identified document type signal;

(h) verifying whether or not the signers are justice with reference to the identified interrelationship information signals on the basis of the identified personal information signals and of the identified document information signal to produce a signature authority verification result;

(i) creating a verification result indicator message indicative of the signature verification result and of the signature authority verification result;

(j) signing, by a second signature scheme different from the first signature scheme, at least the verification result indicator message by using an apparatus's signature key held in an apparatus's signature key holding section to produce a signed document; and (k) outputting the signed document as an output document.

61. A method of performing signature verification for an input document on which a plurality of digital signatures of a plurality of signers are put with a first signature format, the signers being assigned with signer's user ID codes, respectively, said method comprising the steps of:

(a) inputting the input document;

(b) identifying the signer's user ID codes in the input document and document type information indicative of a document type of the input document to produce identified user ID codes and an identified document type signal;

(c) accessing a user verification key holding section for preliminarily holding a plurality of user verification keys for respective user ID codes to make said user verification key holding unit produce, as identified verification keys, ones of the user verification keys that correspond to the identified user ID codes;

(d) verifying the digital signatures signed in the input document by using the identified verification keys with the first signature format to produce a signature verification result;

(e) accessing a user personal information holding unit for preliminarily holding a plurality of user personal information signals for the respective user ID codes to make said user personal information holding unit produce, as identified personal information signals, ones of the user personal information signals that correspond to the identified user ID codes;

(f) accessing a user interrelationship information holding unit for preliminarily holding a plurality of user interrelationship information signals indicative of interrelations between users to make said user interrelationship information holding unit produce, as identified interrelationship information signals, ones of the user interrelationship information signals that correspond to the identified user ID codes;

(g) accessing a document information holding unit for preliminarily holding a plurality of document information signals for respective document types to make said document information holding unit produce, as an identified document information signal, one of the document information signals that corresponds to the identified document type signal;

(h) verifying whether or not the signers are Justice with reference to the identified interrelationship information signals on the basis of the identified personal information signals and of the identified document information signal to produce a signature authority verification result;

(i) creating a verification result indicator message indicative of the signature verification result and of the signature authority verification result;

(j) signing, with a Second signature format different from the first signature format, at least the verification result indicator message by using an apparatus's signature key held in an apparatus's signature key holding section to produce a signed document; and (k) outputting the signed document as an output document.

\* \* \* \* \*